US012725541B2

(12) United States Patent
Ball

(10) Patent No.: US 12,725,541 B2
(45) Date of Patent: Sep. 1, 2026

(54) MOBILE DISPLAY APPARATUS

(71) Applicant: Corey Ball, Glenn Dale, MD (US)

(72) Inventor: Corey Ball, Glenn Dale, MD (US)

( * ) Notice: Subject to any disclaimer, the term of this patent is extended or adjusted under 35 U.S.C. 154(b) by 91 days.

(21) Appl. No.: 18/809,631

(22) Filed: Aug. 20, 2024

(65) Prior Publication Data

US 2025/0069528 A1 Feb. 27, 2025

Related U.S. Application Data

(60) Provisional application No. 63/534,418, filed on Aug. 24, 2023.

(51) Int. Cl.

| | |
|---|---|
| ***G09F 19/12*** | (2006.01) |
| ***G09F 21/04*** | (2006.01) |
| ***G09F 27/00*** | (2006.01) |
| *G09G 3/20* | (2006.01) |
| *G09G 3/32* | (2016.01) |

(52) U.S. Cl.

CPC .......... *G09F 19/125* (2021.05); *G09F 21/045* (2013.01); *G09F 21/048* (2013.01); *G09F 27/00* (2013.01); *G09G 3/2003* (2013.01); *G09G 3/32* (2013.01)

(58) Field of Classification Search

USPC ............................................................ 348/51

See application file for complete search history.

(56) References Cited

U.S. PATENT DOCUMENTS

| | | | | |
|---|---|---|---|---|
| 10,739,613 B2 | 8/2020 | Joseph et al. | |
| 11,222,559 B2 | 1/2022 | Chykeyuk et al. | |
| 2011/0298894 A1* | 12/2011 | Jarvenpaa | H04N 13/324 348/46 |
| 2013/0194644 A1* | 8/2013 | Cable | G03H 1/2294 359/9 |
| 2017/0308905 A1 | 10/2017 | Navaratnam | |
| 2019/0371217 A1 | 12/2019 | Chykeyuk et al. | |
| 2022/0318850 A1 | 10/2022 | Bastiyali | |

FOREIGN PATENT DOCUMENTS

| | | |
|---|---|---|
| EP | 1465126 A2 | 10/2004 |
| EP | 2502109 B1 | 9/2012 |
| EP | 3646998 A1 | 5/2020 |

* cited by examiner

*Primary Examiner* — Nigar Chowdhury

(74) *Attorney, Agent, or Firm* — The Law Firm of Andrea Hence Evans

(57) ABSTRACT

A system may include a processor and a memory. The memory may store instructions. The instructions, when executed by the processor, may cause the system to perform operations. The operations may include receiving a request for content from a client device. The operations may include determining a geographic location associated with the client device. The operations may include identifying content relevant to the geographic location. The operations may include generating a content package. The content package may include the identified content relevant to the geographic location. The operations may include transmitting the content package to the client device.

8 Claims, 38 Drawing Sheets

This picture shows Mi-Robile Touch front view with carrier, and interactive kiosk without panel cover and battery.

MOBILE DISPLAY APPARATUS

CROSS-REFERENCE TO RELATED APPLICATIONS

This application claims the benefit of U.S. Provisional Application No. 63/534,418, filed Aug. 24, 2023, which is incorporated herein by reference in its entirety.

FIELD OF THE INVENTION

The present disclosure relates generally to a mobile display apparatus for displaying advertisements, specifically, a mobile digital marketing apparatus that are used to advertise commercial products by kiosks, video billboards, holograms in the field of interactive marketing application.

BACKGROUND OF THE INVENTION

This disclosure relates generally to digital interactive market and electronic visual projection screens and hologram displays of industry product marketing. This invention incorporates and an array of marketing technology that embodies all the digital marketing into one concept to give the public a one stop feed of the visual and verbal interactive response to their request of products that are new to the market. The public usually would have to go to multiple product displays to get the information they are looking for or have not seen what's new in the product industry.

SUMMARY OF THE INVENTION

This invention incorporates marketing from many advertisement protocols in the industry into one new apparatus that will give advertising agencies, and vendors a totally new way to display their products to corporations and the consumer.

Aspects of embodiments of the present invention contemplate a mobile display apparatus comprising: a holographic platform, where the holographic platform comprises of: a carrier main frame, having a base and a top portion, at least two rear drive wheels and at least one caster wheels, where the rear drive and the caster wheels are connected to the base of the carrier main frame, at least one holographic apparatus, connected to the top portion of the carrier main frame, a turret rotation assembly connected to the base of the carrier main frame, a display carrier, having base and top portions and detachably connected to the holographic platform by way of a detachable wheeled support assembly, where the display carrier comprises of: a display carrier main frame, having top and base portions, a dual display kiosk cabinet, positioned above the top portion of the main frame, the kiosk cabinet bearing two displays, at least two rear drive wheels and at least one caster wheels, where the rear drive and the caster wheels are connected to the base of the display carrier main frame, at least one power source positioned within the base of the display carrier main frame, a motor driver within the base of the display carrier main frame, a control access panel positioned atop the top of display carrier main frame, where the control access panel comprises of at least one central processing unit (CPU), memory, and electronic components for operation of the mobile display apparatus, and an accordion panel cover, covering the dual display kiosk cabinet.

In an aspect of an embodiment of the present invention the holographic platform of the mobile display apparatus further comprises a tubular shield.

In an aspect of an embodiment of the present invention the holographic platform of the mobile display apparatus further comprises of a hologram tower fastened to a base of a hologram tube casing, where the hologram tube casing is connected to the top portion of the carrier main frame In an aspect of an embodiment of the present invention the holographic platform of the mobile display apparatus further comprises of at least one hologram generator, at least one light bar, and at least light bar strip, where all are positioned within the hologram tower.

In an aspect of an embodiment of the present invention the two displays of the mobile display apparatus may be structured to be telescoping by way of kiosk telescoping lift system positioned within the dual display kiosk cabinet.

In an aspect of an embodiment of the present invention the CPU of the mobile display apparatus may further comprise of computer readable medium for operations of the mobile display apparatus.

In an aspect of an embodiment of the present invention the display carrier of the mobile display apparatus may further comprise of at least one AC-DC/DC-AC converter connected to at least one component of the mobile display apparatus.

In an aspect of an embodiment of the present invention the display carrier of the mobile display apparatus may further comprise of at least one interchangeable display window.

In an aspect of an embodiment of the present invention the components, elements, etc. of the mobile display apparatus are contemplated as displayed/disclosed in the accompanying drawings, disclosures, white paper etc. and all as necessary for operation of the mobile display apparatus.

Another aspect of an embodiment of the present invention contemplates a mobile display apparatus having at least one visual display with voice kiosks having telescoping capabilities, where the mobile display apparatus is carried on a robotic carrier wheel assembly which has autonomous and semi-autonomous self-propelled wheel drive(s) with mix steering and attached vertical holograms displayed in at least one tubular case placed on the robotic carrier wheel assembly.

In another aspect of an embodiment of the present invention, the top center manual protruding telescoping kiosk hologram display of the mobile display apparatus may be structurally capable of 360-degree rotation by two kiosks which are positioned back-to-back.

In another aspect of an embodiment of the present invention, the mobile display apparatus may further comprise of an interchangeable Illuminating marketing display window within the kiosks panels with color changing LED lighting which may be controlled by a remote cell phone application.

In another aspect of an embodiment of the present invention, the mobile display apparatus may further comprise of a dual power apparatus that has dual batteries which supplies DC and AC voltage to AC components by means of multiple DC to AC converters.

In another aspect of an embodiment of the present invention, the mobile display apparatus may further comprise of dual panels of the kiosks which may be structured to nest one into the other in a telescopic manner with the kiosks being structured to elevate and descend within one another without making contact with one another.

In another aspect of an embodiment of the present invention, the mobile display apparatus may further comprise of dual stationary panels that circumference inner telescoping panels of the mobile display apparatus without touching as they elevate covering exposes wiring when elevating.

In another aspect of an embodiment of the present invention, the mobile display apparatus may further comprise of an accordion cover attached to the inner telescoping panels which cover all wiring and component when kiosks and panels elevate pass the point of the coverage of the stationary panels.

In another aspect of an embodiment of the present invention, the mobile display apparatus may further comprise of an omnidirectional, variable speed remote wireless turret system that connects to the base of the hologram tubular case plate form assembly which gives it the capability to display holograms 360 degrees when in motion or stationary.

In another aspect of an embodiment of the present invention, the mobile display apparatus may further comprise of a motor drive system capable of receiving commands from a cell phone and capable of following the cell phone at preset distance and speed.

In another aspect of an embodiment of the present invention, the mobile display apparatus may be robotic, semi-autonomous and/or remote-controlled.

In one or more aspects, a mobile digital marketing apparatus may include a remote controlled robotic carrier with interactive display kiosks and multiple hologram displays. The apparatus may include a semi-autonomous remote controlled robotic mobile carrier incorporated with multiple holograms and kiosks that display commercial branding of products and advertisements. The apparatus may interact with the general public.

Additional aspects, objectives, features and advantages of the present invention will become apparent from the following description of the preferred embodiments with reference to the attached drawings, white paper, and miscellaneous disclosure.

DETAILED DESCRIPTION OF THE INVENTION

Figure 1:
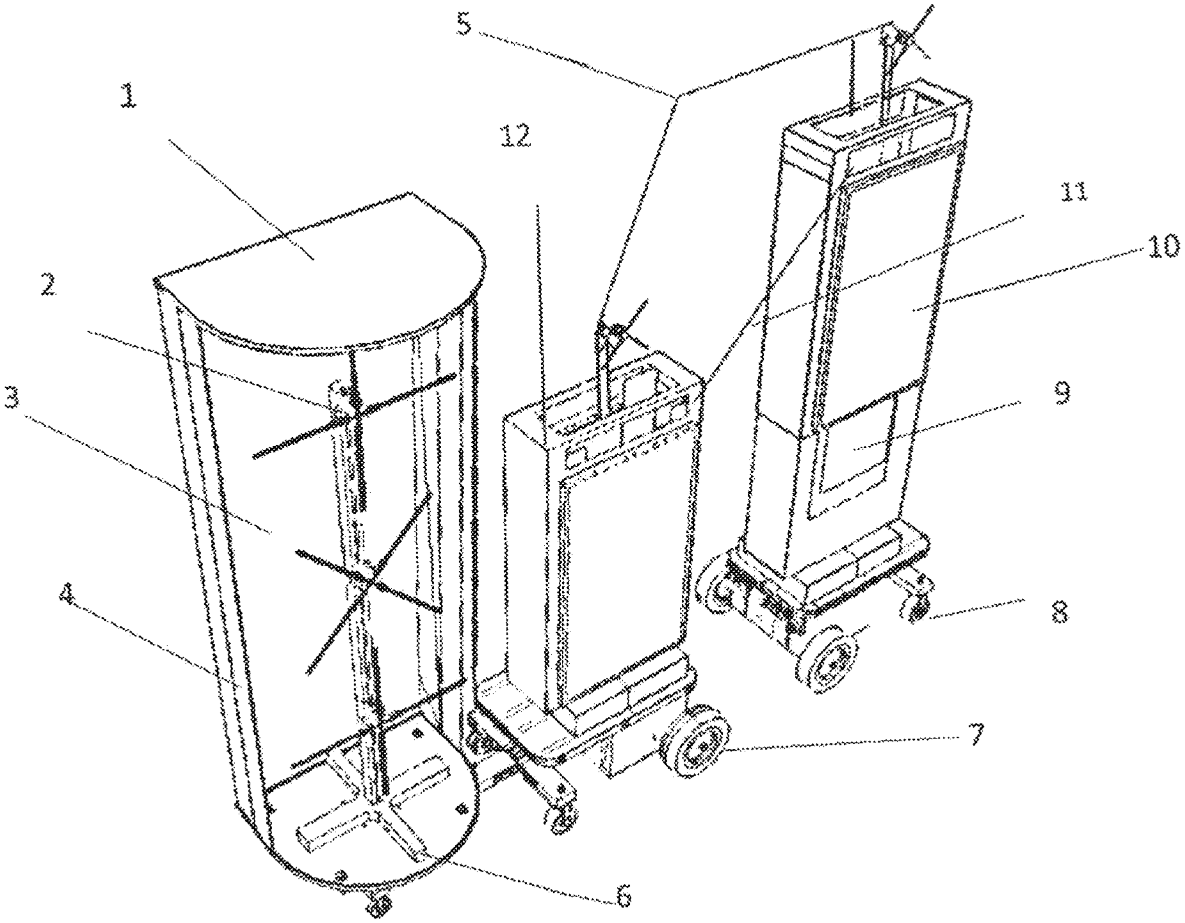
FIG. 1 illustrates a perspective view of a mobile display apparatus according to aspect(s) of embodiments of the present invention.

The present disclosure includes many aspects and features. Moreover, while many aspects and features relate to, and are described in, the context of systems and methods of fraud identification, embodiments of the present disclosure are not limited to use only in this context. The present disclosure can be understood more readily by reference to the following detailed description of the disclosure and the examples included therein.

Before the present articles, systems, apparatuses, and/or methods are disclosed and described, it is to be understood that they are not limited to specific methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

a. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise. As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

The following description of various embodiments is merely exemplary in nature and is in no way intended to limit the disclosure, its application, or uses.

Regarding the present disclosure, digital marketing and advertising technologies may continue to evolve to meet changing consumer preferences and behaviors. Traditional static displays and billboards may have limitations in capturing attention and providing rich content. While digital signage may improve engagement, it may often be fixed in one location.

Mobile advertising platforms may offer advantages over stationary displays. However, conventional mobile advertising methods may lack interactivity or real-time data collection capabilities. There may be challenges in creating immersive experiences that can adapt to different environments.

Robotic technologies may provide new opportunities for mobile advertising. Autonomous or remotely controlled robotic platforms may allow advertising content to be dynamically positioned. However, integrating advanced display technologies with mobile robotic systems may present technical challenges.

Interactive kiosks may enable two-way engagement with consumers. Touch screens, cameras, and sensors may allow for personalized interactions. But stationary kiosks may be limited in their ability to reach consumers in different locations.

Holographic and 3D display technologies may create eye-catching visual experiences. However, implementing such displays in mobile platforms may involve complexities related to power, stability, and environmental factors.

Real-time analytics and data collection may provide valuable insights for advertisers. But seamlessly integrating such capabilities into mobile advertising platforms may require overcoming technical hurdles.

Digital interactive marketing and electronic visual projection screens and hologram displays are used for industry product marketing. Marketing technology may embody digital marketing concepts to provide visual and verbal interactive responses to product requests. The public may go to multiple product displays to get information or see new products in the industry.

Referring now to FIGS. 1 through 19, different views of a mobile display apparatus are shown according to aspects of embodiments of the present invention.

As can be seen in FIGS. 1-19, the invention comprise a semi-autonomous remote controlled robotic mobile carrier that's incorporated with multiple holograms including human and kiosks that displays commercial branding of products, advertisement, and interaction with the general public.

Referring now to FIG. 1 is a perspective view of mobile display apparatus with a display of all major assemblies and attachments according to aspect(s) of embodiment(s) of the present invention. The hologram tube casing 1 is supported by wheeled platform that is attached to the mobile display apparatus when in use in conjunction with displays. It is incorporated with three holograms 2 that can simultaneously show multiple holograms or on large hologram that is usually for size human display. Polycarbonate tubular shield 3 is to protect the blades when spinning at a high rate of speed and from viewers from injuries as to hands reaching to touch hologram figures. Side panels 4 are for quick access to install or remove holograms. Holograms 5 depicts holograms that telescope and rotate 360 degrees from the center of the dual kiosk display cabinet 12. Hologram tower is fastened to base of 1 hologram tube casing has a vertical track to adjust the positioning of the holograms 2. Rear drive wheels 7 propel the Mobile display apparatus with mix steering along with 8 front caster wheels. Accordion panel cover prevents view of component, wiring and safety of hands reaching into opening when kiosks 10 are elevating and descending. Illuminating logo marketing display window 11 is interchangeable as to advertise different logos as requested.

FIG. 1 shows a perspective view of an embodiment. A hologram tube casing 1 may be supported by a wheeled platform attached to a carrier when in use with displays. It may be incorporated with three holograms 2 that may simultaneously show multiple holograms or one large hologram. A polycarbonate tubular shield 3 may protect blades when spinning. Side panels 4 may allow quick access to install or remove holograms. Holograms 5 may telescope and rotate 360 degrees from the center of a dual kiosk display cabinet 12. A hologram tower may be fastened to a base of hologram tube casing 1 and may have a vertical track to adjust positioning of holograms 2. Rear drive wheels 7 may propel the carrier with mixed steering along with front caster wheels 8. An accordion panel cover 9 may prevent viewing of components and wiring. Kiosks 10 may elevate and descend. An illuminating logo marketing display window 11 may be interchangeable to advertise different logos.

Figure 2A:
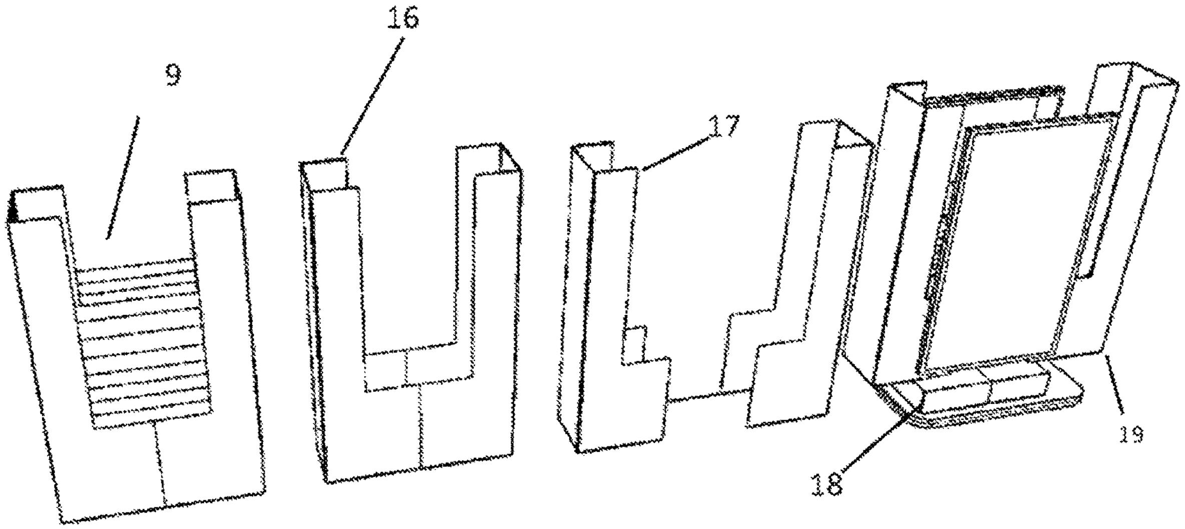
FIG. 2A illustrates a perspective view of stationary panels of the mobile display apparatus according to aspect(s) of embodiments of the present invention.

Referring now to FIG. 2A, a perspective view of stationary panels of the mobile display apparatus is illustrated according to aspect(s) of embodiments of the present invention. This figure displays the outer panels 16, 17 which are stationary and how they fit around the kiosks 10. Components control access panels 18 are for quick access to electronic and power distribution components. FIG. 2A shows outer panels 16, 17 which may be stationary and may fit around kiosks 10. Components control access panels 18 may allow quick access to electronic and power distribution components.

Figure 2B:
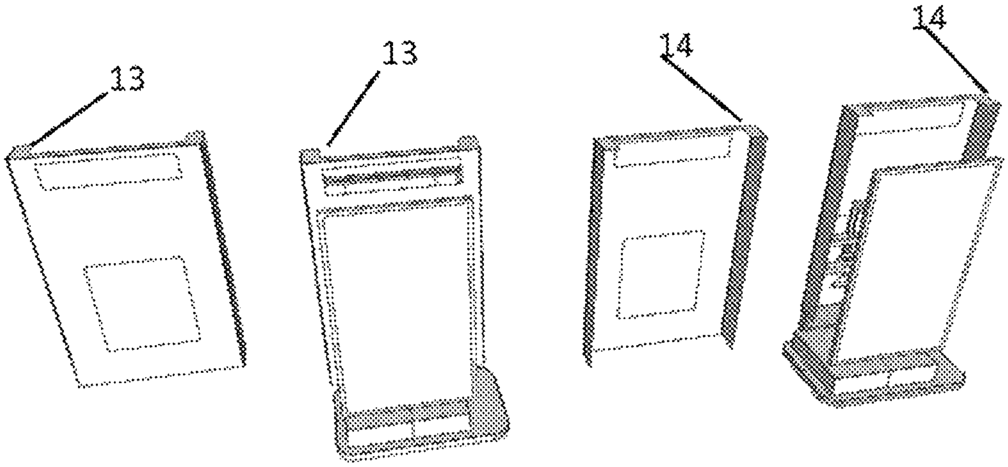
FIG. 2B illustrates perspective front views of the left side elevating panels of the mobile display apparatus according to aspect(s) of embodiments of the present invention.

Referring now to FIG. 2B, perspective front views of the left side elevating panels of the mobile display apparatus are illustrated according to aspect(s) of embodiments of the present invention. This figure displays the inner panels left side 14, right side 13. The panel on the right side 13 is slightly wider than panel 14 giving them the ability to move up and down with the kiosk 10 without touching for elevation and descending when telescoping. FIG. 2B shows inner panels—left side 14, right side 13. Panel 13 may be slightly wider than panel 14, allowing them to move up and down with kiosk 10 without touching for elevation and descending when telescoping.

Figure 2C:
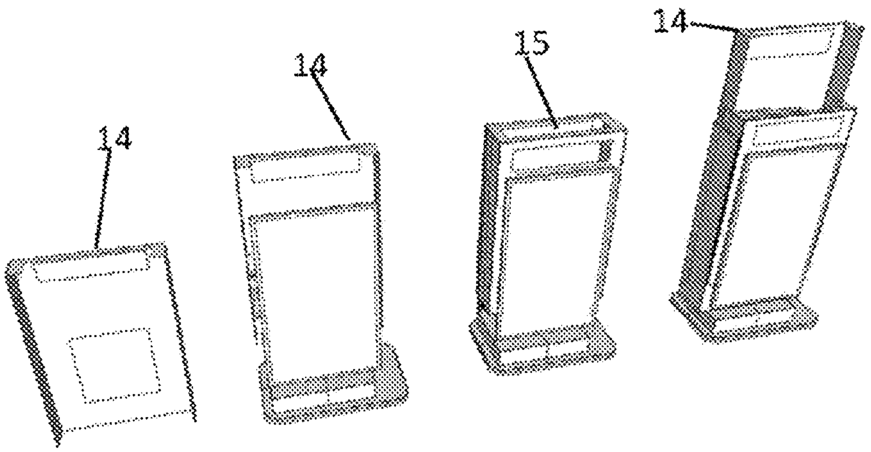
FIG. 2C illustrates a perspective front view of the right-side elevating panels of the mobile display apparatus according to aspect(s) of embodiments of the present invention.

Referring now to FIG. 2C, a perspective front views of the right-side elevating panels of the mobile display apparatus is illustrated according to aspect(s) of embodiments of the present invention. This figure displays a home position of kiosk 10 with panels 13 and 14 nested into one another. Panel 14 is shown elevated and nesting inside stationary panels 16. FIG. 2C shows a home position of kiosk 10 with panels 13 and 14 nested. Panel 14 is shown elevated and nesting inside stationary panels 16.

Figure 3A:
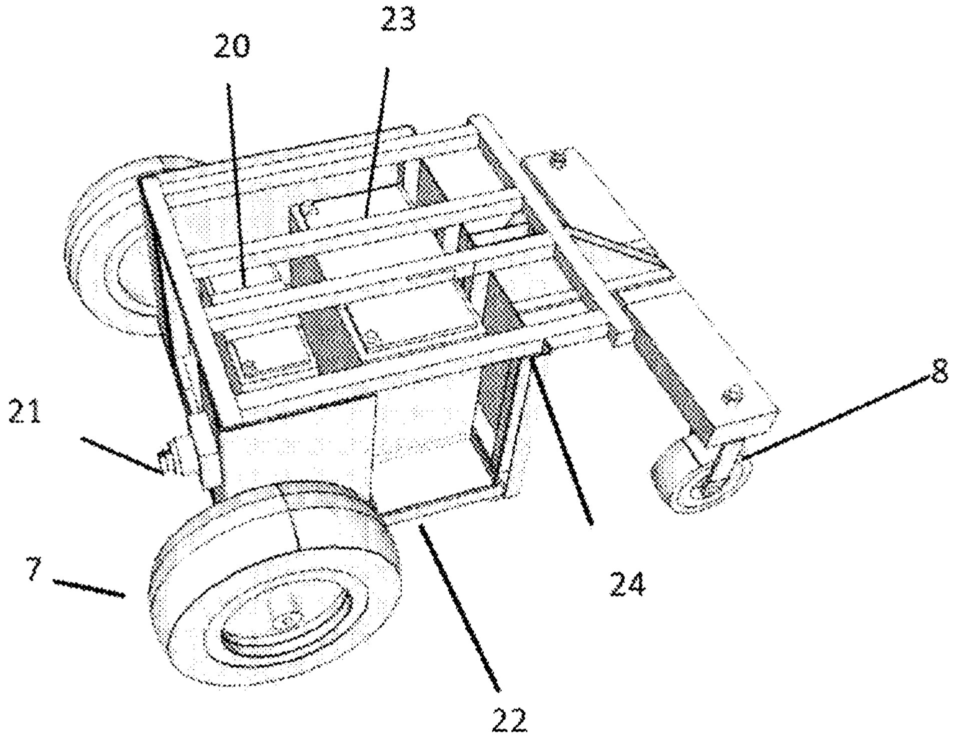
FIG. 3A illustrates a perspective view of carrier frame and drive power components of the mobile display apparatus according to aspect(s) of embodiments of the present invention.

Referring now to FIG. 3A, a perspective view of carrier frame and drive power components of the mobile display apparatus is illustrated according to aspect(s) of embodiments of the present invention. This figure displays the Mobile display apparatus main frame 24 and power sources main battery 23, secondary battery 20. power switch 21 is connected to the main battery 23 which sends power to the motor driver 46 FIG. 6D. FIG. 3A shows a carrier main frame 24 and power sources main battery 23, secondary battery 20. A power switch 21 may be connected to main battery 23 which may send power to a motor driver 46 (FIG. 6D).

Figure 3B:
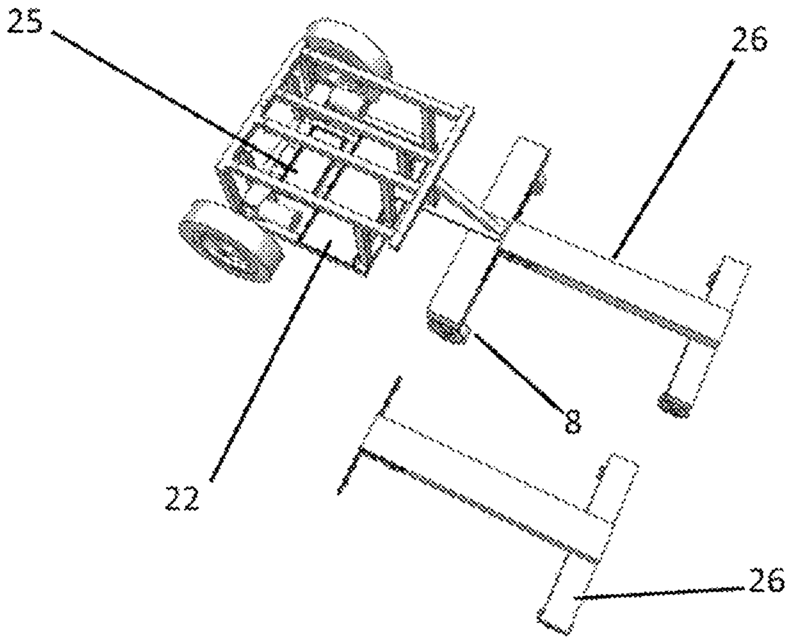
FIG. 3B illustrates a right perspective view of the carrier frame of the self-propelled wheel drive assembly of the mobile display apparatus with a hologram attachment frame, according to aspect(s) of embodiment(s) of the present invention.

Referring now to FIG. 3B, a right perspective view of the carrier frame of the self-propelled wheel drive assembly of the mobile display apparatus is illustrated with a hologram attachment frame, according to aspect(s) of embodiment(s) of the present invention. FIG. 3B shows a perspective view of the carrier frame that displays the secondary battery tray 25 and main battery tray 22. Connected to the Mobile display apparatus frame is the detachable hologram wheeled support assembly 26. FIG. 3B shows a secondary battery tray 25 and main battery tray 22. A detachable hologram wheeled support assembly 26 may be connected to the carrier frame.

Figure 3C:
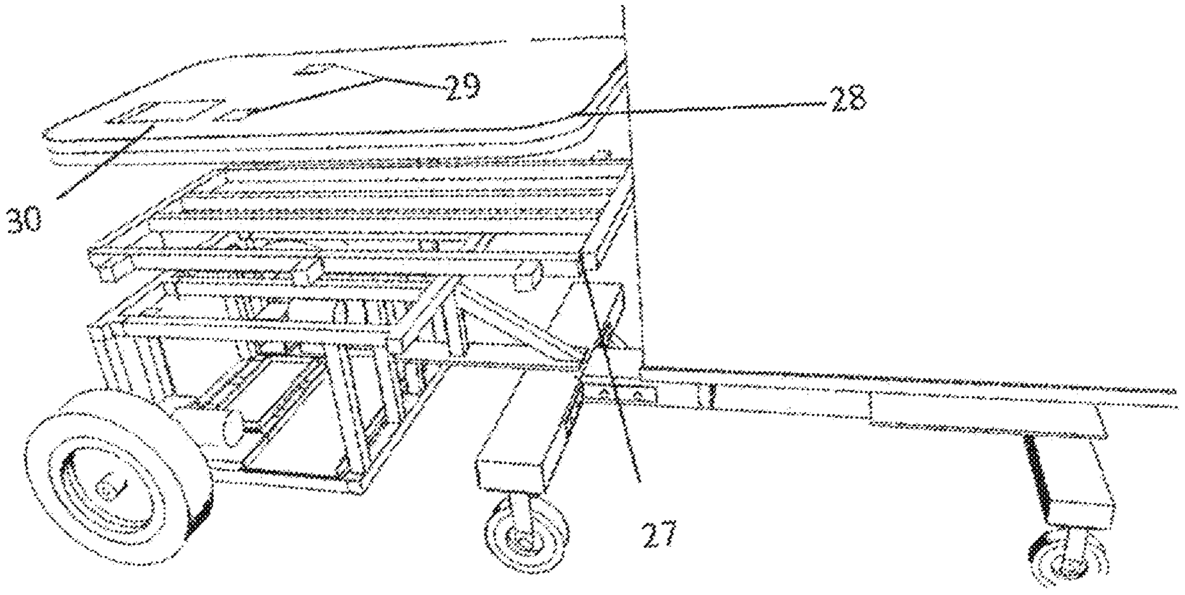
FIG. 3C illustrates a perspective view of a carrier upper frame of the mobile display apparatus having a cover with access points displayed according to aspect(s) of embodiment(s) of the present invention.

Referring now to FIG. 3C, a perspective view of a carrier upper frame of the mobile display apparatus is illustrated having a cover with access points displayed according to aspect(s) of embodiment(s) of the present invention. FIG. 3C shows a side perspective view of Mobile display apparatus frame 24 with upper frame 27 and cover 28. The upper frame and cover have access points to battery post 29 and motor driver connections 30. FIG. 3C shows a carrier frame 24 with upper frame 27 and cover 28. The upper frame and cover may have access points to battery posts 29 and motor driver connections 30.

Figure 3D:
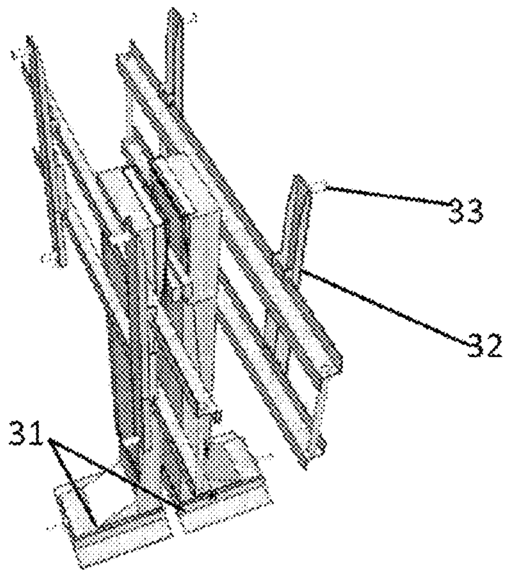
FIG. 3D illustrates a top perspective view of the telescoping kiosks and panels lift system of the mobile display apparatus according to aspect(s) of embodiment(s) of the present invention.

Referring now to FIG. 3D, a top perspective view of the telescoping kiosks and panels lift system of the mobile display apparatus is illustrated according to aspect(s) of embodiment(s) of the present invention. FIG. 3D shows a top perspective view of kiosks telescoping lift system 31. The latch hooks 32 are connected to the back of kiosks 10 to screws 33 and the inner panels 13 and 14 are connected to the kiosk 10. When 31 is activated to telescope simultaneously or individually it elevates and descends each panel and kiosk together as one component. FIG. 3D shows a kiosks telescoping lift system 31. Latch hooks 32 may be connected to the back of kiosks 10 to screws 33 and inner panels 13 and 14 may be connected to kiosk 10. When 31 is activated to telescope, it may elevate and descend each panel and kiosk together.

Figure 4A:
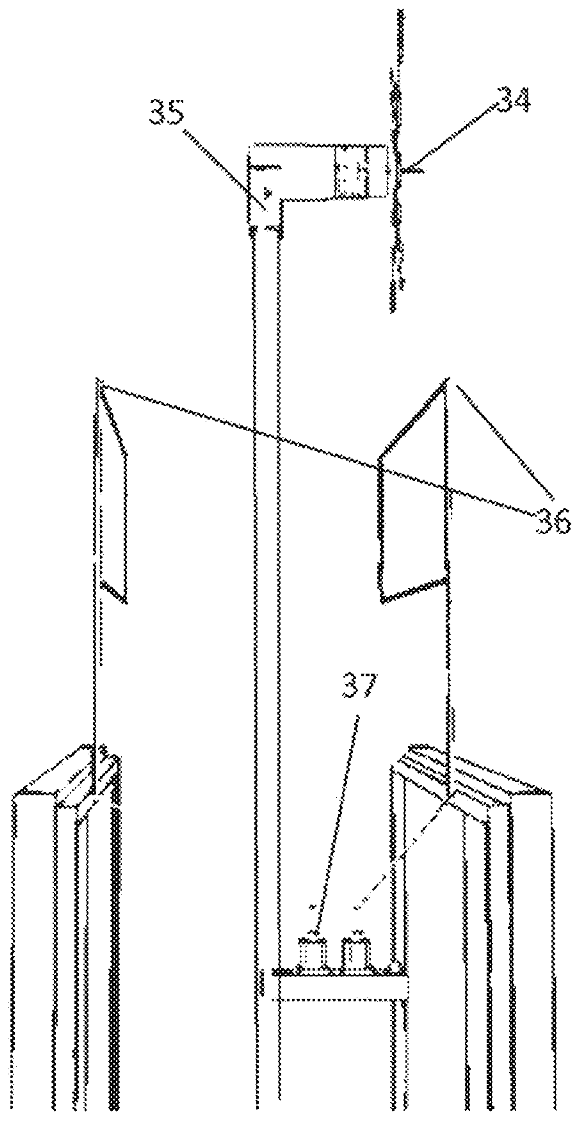
FIG. 4A illustrates a front view placement of the light bars and center hologram of the mobile display apparatus according to aspect(s) of embodiment(s) of the present invention.

Referring now to FIG. 4A, a front view placement of the light bars and center hologram of the mobile display apparatus is illustrated according to aspect(s) of embodiment(s) of the present invention. FIG. 4A shows a side view of the internal upper display section which includes 34 hologram, 35 hologram power cord, 36 light bars and 37 light bar power strip. FIG. 4A shows an internal upper display section which may include hologram 34, hologram power cord 35, light bars 36 and light bar power strip 37.

Figure 4B:
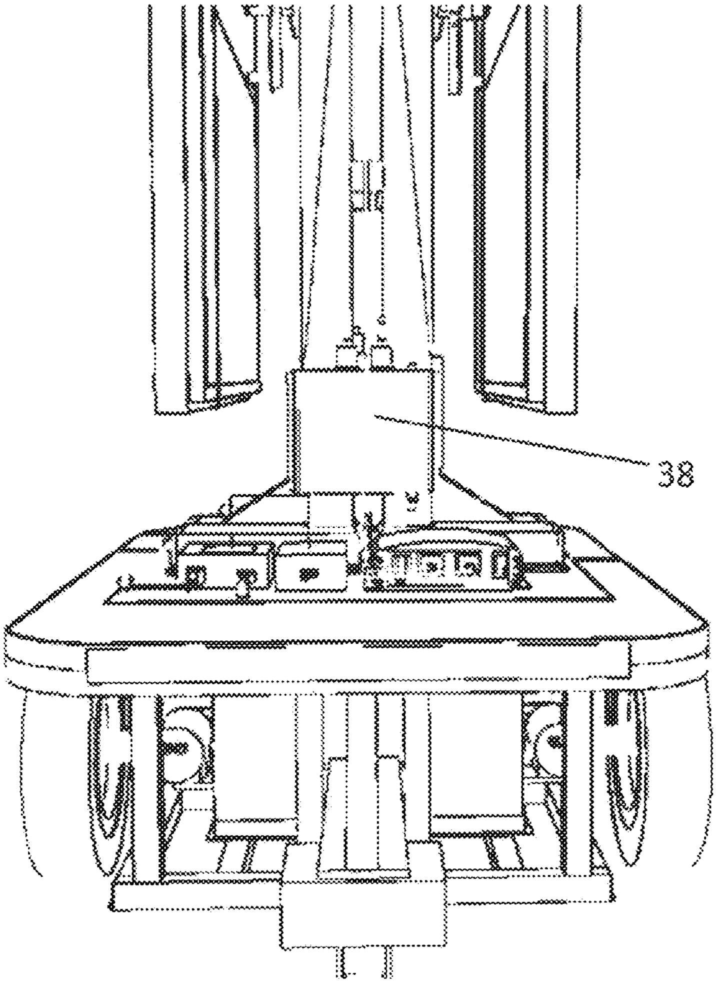
FIG. 4B illustrates a rear view of carrier with cover and components DC to AC converter of the mobile display apparatus according to aspect(s) of embodiment(s) of the present invention.

Referring now to FIG. 4B, a rear view of carrier with cover and components DC to AC converter of the mobile display apparatus is illustrated according to aspect(s) of embodiment(s) of the present invention. FIG. 4B shows a rear view of carrier with cover and components 38 DC to AC converter 1 which supplies AC voltage to 37 light bar power strips, 34 hologram. FIG. 4B shows a DC to AC converter 38 which may supply AC voltage to light bar power strips 37, hologram 34.

Figure 4C:
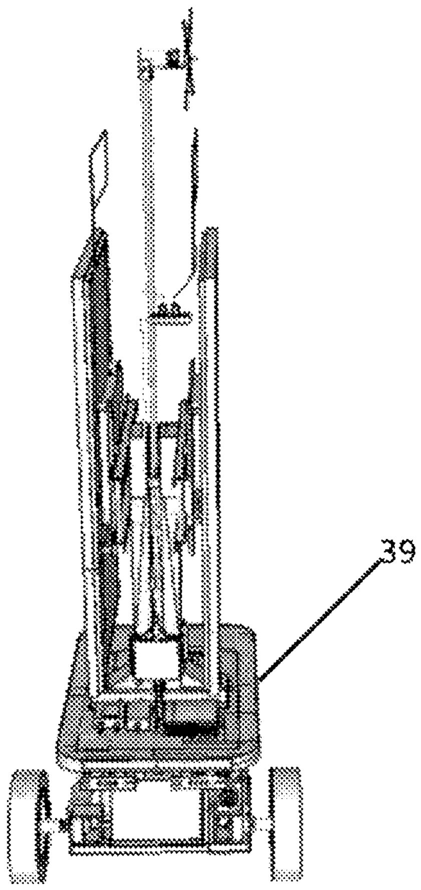
FIG. 4C illustrates a rear view of carrier frame with components of the mobile display apparatus, according to aspect(s) of embodiments of the present invention without panel covers.

Referring now to FIG. 4C, a rear view of carrier frame with components of the mobile display apparatus is illustrated, according to aspect(s) of embodiments of the present invention without panel covers. FIG. 4C shows a rear view of Mobile display 39 DC to AC converter 2 which gets its supply voltage from 23 the main battery. This converter delivers 1200 watts of power to supply long run time to 10 both interactive Kiosks. FIG. 4C shows a DC to AC converter 39 which may get supply voltage from main battery 23. This converter may deliver power to supply both interactive kiosks 10.

Figure 5A:
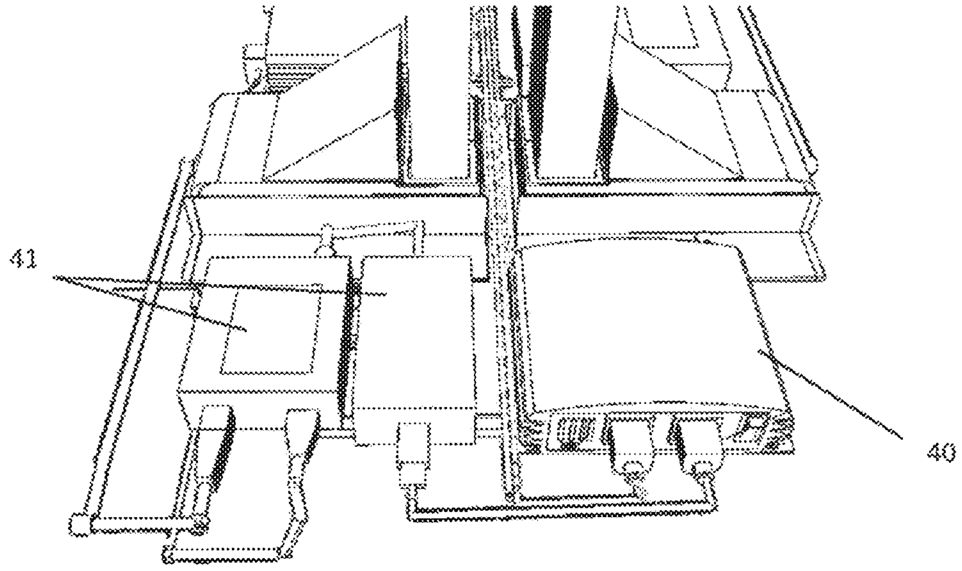
FIG. 5A illustrates a front tilt view for the DC to AC converter and Kiosks lift control components of the mobile display apparatus according to aspect(s) of embodiment(s) of the present invention.

Referring now to FIG. 5A, a front tilt view for the DC to AC converter and Kiosks lift control components of the mobile display apparatus is illustrated according to aspect(s) of embodiment(s) of the present invention. FIG. 5A displays a front tilt view of Mobile display 31 kiosks lift system source of power 40 DC to AC converter 3 and 41 left side kiosk control units which supplies power and control. This system has two means of control which direct line by FIG. 5B 42, two individual control display panels for each side. They can be lifted or lower by directional arrows on display panels or three preset positions. Also, each kiosk has individual wireless remote controls with the same functions. As indicated 40 Converter 3 voltage is supplied by the 20 secondary battery which is not frequently used and requires less energy source. FIG. 5A shows a kiosks lift system source of power 40 DC to AC converter 3 and left side kiosk control units 41 which may supply power and control. This system may have two means of control—direct line by FIG. 5B 42, two individual control display panels for each side. They may be lifted or lowered by directional arrows on display panels or three preset positions. Each kiosk may have individual wireless remote controls with the same functions. Converter 3 voltage may be supplied by secondary battery 20.

Figure 5B:
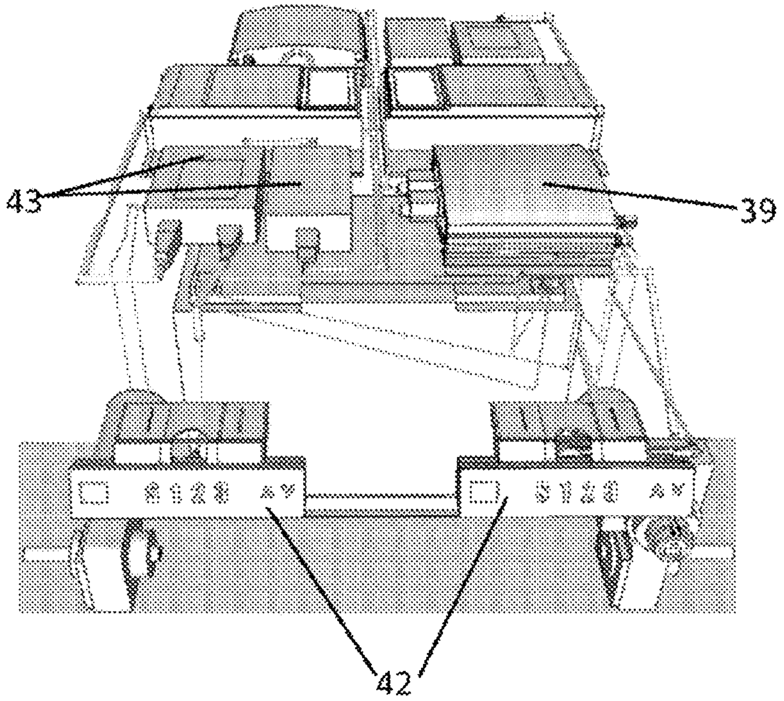
FIG. 5B illustrates a rear tilt view for the Kiosks lift control components with manual control panel of the mobile display apparatus according to aspect(s) of embodiment(s) of the present invention.

Referring now to FIG. 5B, a rear tilt view for the Kiosks lift control components with manual control panel of the mobile display apparatus is illustrated according to aspect(s) of embodiment(s) of the present invention. FIG. 5B displays 41 manual individual lift system control panels, and 43 right side kiosk control units which supplies power and control. Also 39 Converter 2 which supplies AC power to 10 kiosks. FIG. 5B shows manual individual lift system control panels 41, and right side kiosk control units 43 which may supply power and control. Converter 2 39 may supply AC power to kiosks 10.

Figure 6A:
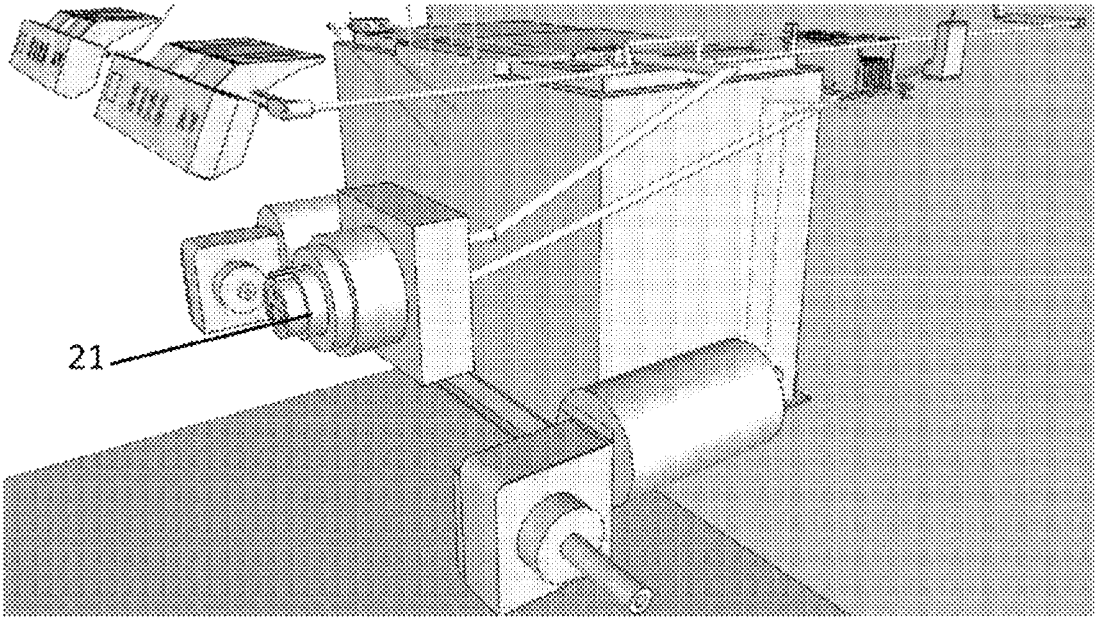
FIG. 6A illustrates a rear view of the main power switch for wheel drive system of the mobile display apparatus according to aspect(s) of embodiment(s) of the present invention.

Referring now to FIG. 6A a rear view of the main power switch for wheel drive system of the mobile display apparatus is illustrated according to aspect(s) of embodiment(s) of the present invention. FIG. 6A displays the negative power coming from the battery to the power switch 21 and when switch is turned to the on position negative connection is supplied the negative side of the motor driver. FIG. 6D positive side of the motor driver 47 is always in contact with the battery positive terminal and when the positive side is activated completes the circuit for activation of the FIG. 6B motor driver. FIG. 6A shows negative power coming from the battery to power switch 21 and when switched on may supply the negative side of the motor driver. FIG. 6D positive side of the motor driver 47 may always contact the battery positive terminal and when activated may complete the circuit for activation of the FIG. 6B motor driver.

Figure 6B:
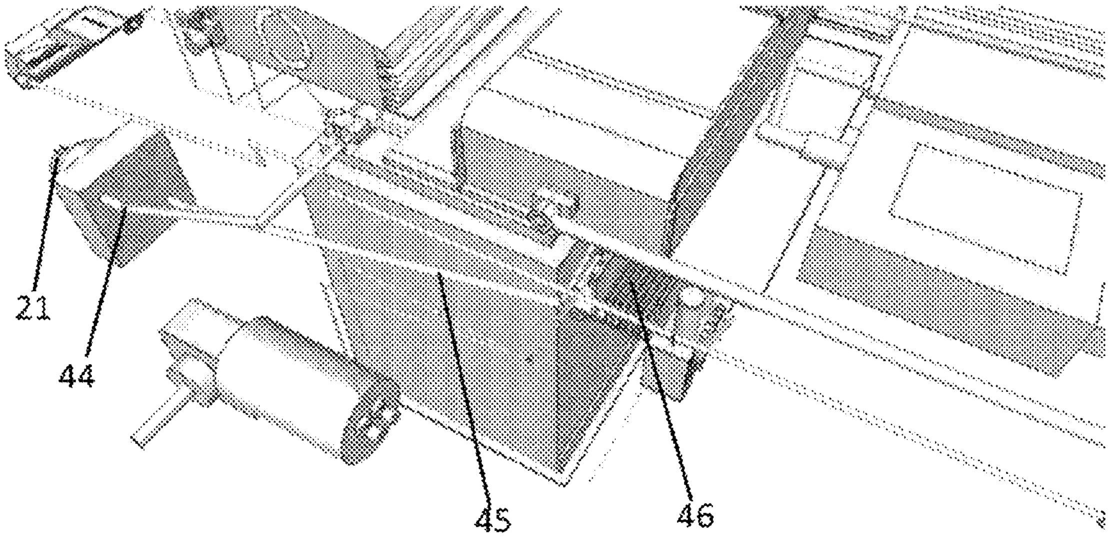
FIG. 6B illustrates a perspective view of the main power switch negative voltage transfer of the mobile display apparatus according to aspect(s) of embodiment(s) of the present invention.

Referring now to FIG. 6B, a perspective view of the main power switch negative voltage transfer of the mobile display apparatus according to aspect(s) of embodiment(s) of the present invention. FIG. 6B displays 21 main power switch, 44 negative source from power switch 21 and 45 motor driver negative source. FIG. 6B shows main power switch 21, negative source from power switch 44 and motor driver negative source 45.

Figure 6C:
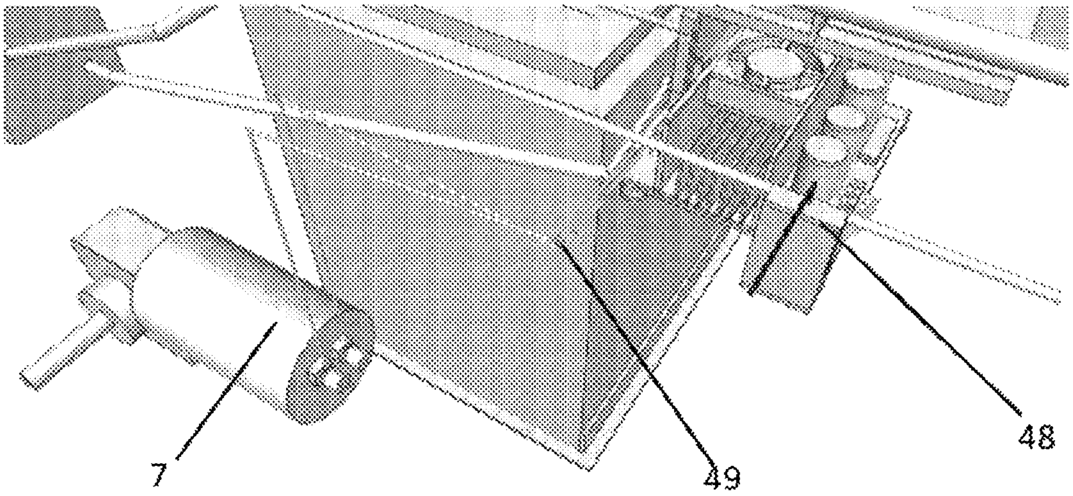
FIG. 6C illustrates a perspective view of the wheel drive gear motor, motor drive and receiver of the mobile display apparatus according to aspect(s) of embodiment(s) of the present invention.
Figure 6D:
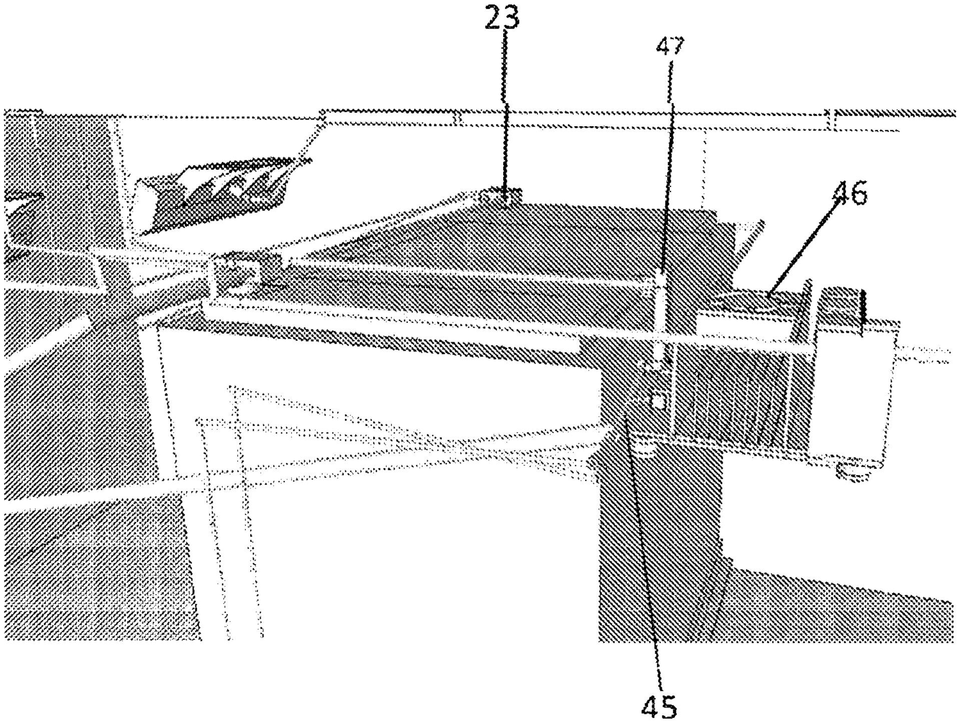
FIG. 6D illustrates a perspective view of the motor drive and power distribution of the mobile display apparatus according to aspect(s) of embodiment(s) of the present invention.

Referring now to FIG. 6C, a perspective view of the wheel drive gear motor, motor drive and receiver of the mobile display apparatus is illustrated according to aspect(s) of embodiment(s) of the present invention. FIG. 6C displays the wire connection 49 of the FIG. 1 gear motors 7 to the motor driver and the motor driver receiver and antenna 48. The receiver receives its commands from the wireless remote control that has been matched electronically to prevent frequency commands from other remotes. This receiver through software apps can be controlled with cell phone and follow the phone carrier at preset distance with follow me technology. FIG. 6C shows wire connection 49 of gear motors 7 to the motor driver and motor driver receiver and antenna 48. The receiver may receive commands from a wireless remote control matched electronically to prevent frequency commands from other remotes. This receiver through software apps may be controlled with a cell phone and follow the phone carrier at preset distance with follow me technology.

Referring now to FIG. 6D, a perspective view of the motor drive and power distribution of the mobile display apparatus is illustrated according to aspect(s) of embodiment(s) of the present invention. FIG. 6D displays 45 negative connection to motor driver 46, 47 positive voltage from 23 main battery to motor driver 46. FIG. 6D shows negative connection 45 to motor driver 46, positive voltage 47 from main battery 23 to motor driver 46.

Figure 7:
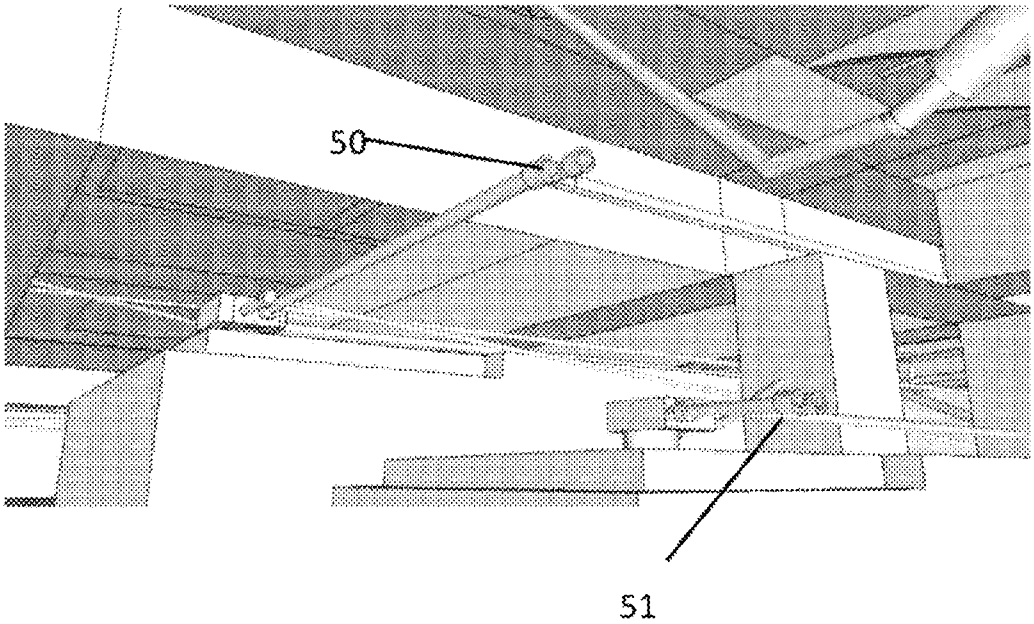
FIG. 7 illustrates a view of battery charging ports of the mobile display apparatus according to aspect(s) of embodiment(s) of the present invention.

Referring now to FIG. 7, a view of battery charging ports of the mobile display apparatus is illustrated according to aspect(s) of embodiment(s) of the present invention. FIG. 7 displays battery charging ports 50 to main battery 23 and 51 to secondary battery 20. This set up allows quick access to battery chargers with having to connect to battery located in the frame of Mobile display. FIG. 7 shows battery charging ports 50 to main battery 23 and 51 to secondary battery 20. This setup may allow quick access to battery chargers without connecting to batteries located in the frame.

Figure 8:
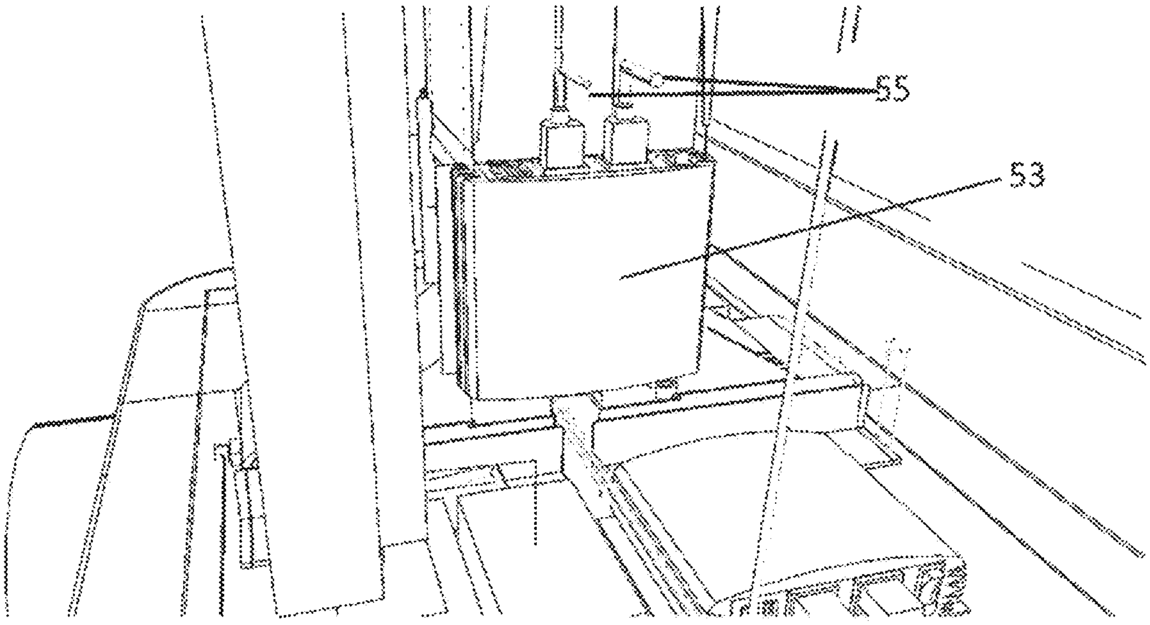
FIG. 8 illustrates a front view of the attached hologram input and out power distribution of the mobile display apparatus according to aspect(s) of embodiment(s) of the present invention.

Referring now to FIG. 8, a front view of the attached hologram input and out power distribution of the mobile display apparatus is illustrated according to aspect(s) of embodiment(s) of the present invention. FIG. 8 displays the power for the hologram cylinder display case which is 53 DC to AC converter 4 when attached to the mobile display apparatus by power cables 55. Converter 4 source of power comes from the main battery 23 when required. FIG. 8 shows power for the hologram cylinder display case which may be DC to AC converter 4 53 when attached by power cables 55. Converter 4 source of power may come from main battery 23 when required.

Figure 9A:
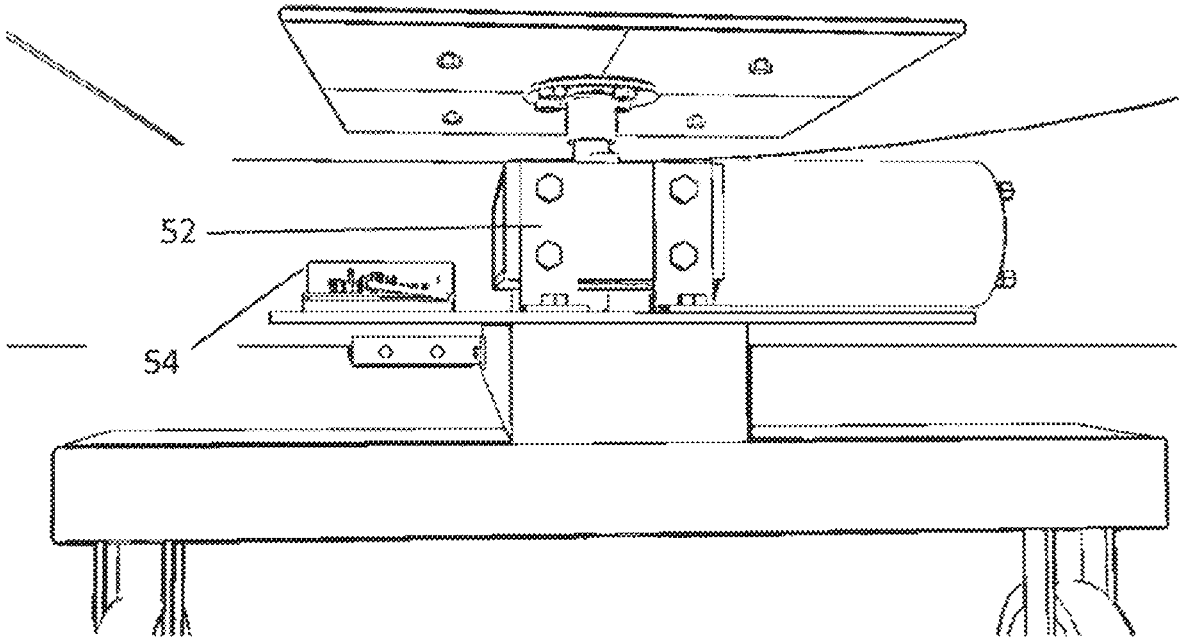
FIG. 9A illustrates a front view of a gear motor assembly and remote-controlled drive attached hologram cylinder case base of the mobile display apparatus according to aspect(s) of embodiment(s) of the present invention.

Referring now to FIG. 9A, a front view of a gear motor assembly and remote-controlled drive attached hologram cylinder case base of the mobile display apparatus is illustrated according to aspect(s) of embodiment(s) of the present invention. FIG. 9A displays parts assembled for the turret rotation 52, and its 360-degree rotation capability along with 54 wireless remote controlled motor driver that controls turret direction and speed of rotation. FIG. 9A shows parts assembled for turret rotation 52, and its 360 degree rotation capability along with wireless remote controlled motor driver 54 that may control turret direction and speed of rotation.

Figure 9B:
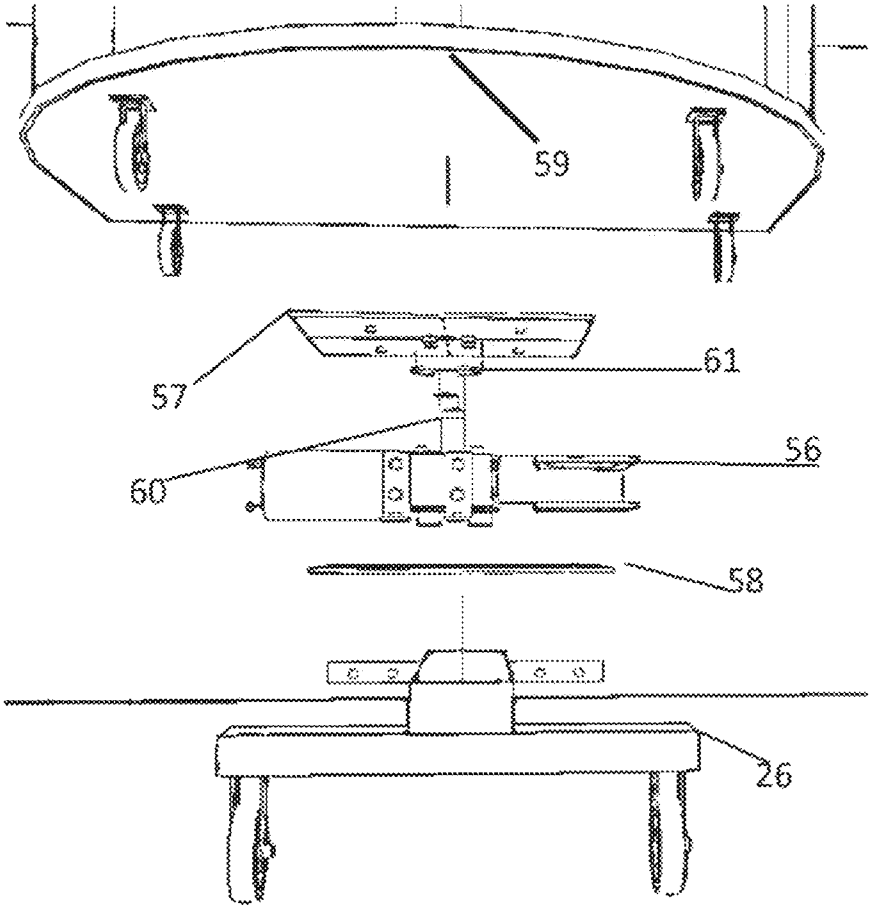
FIG. 9B illustrates a front view of the hologram cylinder rotation components sequence connection of the mobile display apparatus according to aspect(s) of embodiment(s) of the present invention.

Referring now to FIG. 9B, a front view of the hologram cylinder rotation components sequence connection of the mobile display apparatus is illustrated according to aspect(s) of embodiment(s) of the present invention. FIG. 9B displays a front bottom view of hologram tubular base sequence connection in parts to the turret assemble. FIG. 3B hologram wheeled support assembly 26 turret base, 57 hologram base connector plate, 56 gear motor top and bottom plates, 56 base plate to connect gear motor assemble to FIG. 3B hologram wheeled support assemble. 60 gear motor shaft is connected to 61 gear motor coupler which is fastened to 57 hologram base connector plate to rotate the hologram tubular base. FIG. 9B shows a front bottom view of hologram tubular base sequence connection in parts to the turret assembly. FIG. 3B hologram wheeled support assembly 26 turret base, hologram base connector plate 57, gear motor top and bottom plates 56, base plate to connect gear motor assembly to FIG. 3B hologram wheeled support assembly. Gear motor shaft 60 may be connected to gear motor coupler 61 which may be fastened to hologram base connector plate 57 to rotate the hologram tubular base.

Figure 9C:
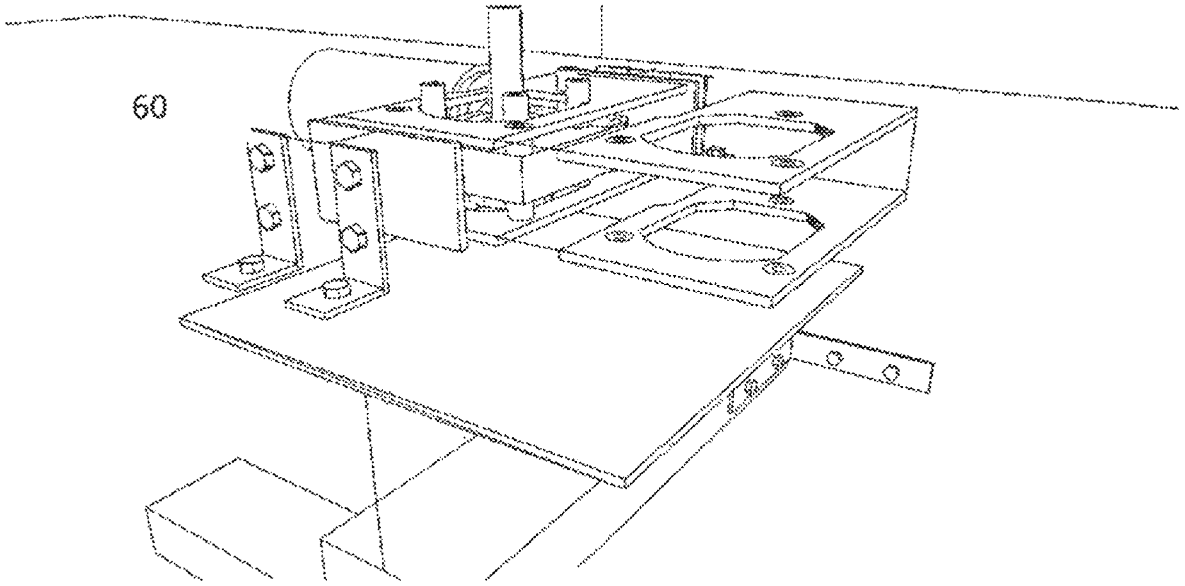
FIG. 9C illustrates is a perspective view of the hologram cylinder rotation components sequence connection of the mobile display apparatus according to aspect(s) of embodiment(s) of the present invention.

Referring now to FIG. 9C, is a perspective view of the hologram cylinder rotation components sequence connection of the mobile display apparatus is illustrated according to aspect(s) of embodiment(s) of the present invention. FIG. 9C displays a perspective view of 9B. FIG. 9C shows a perspective view of 9B.

Figure 10:
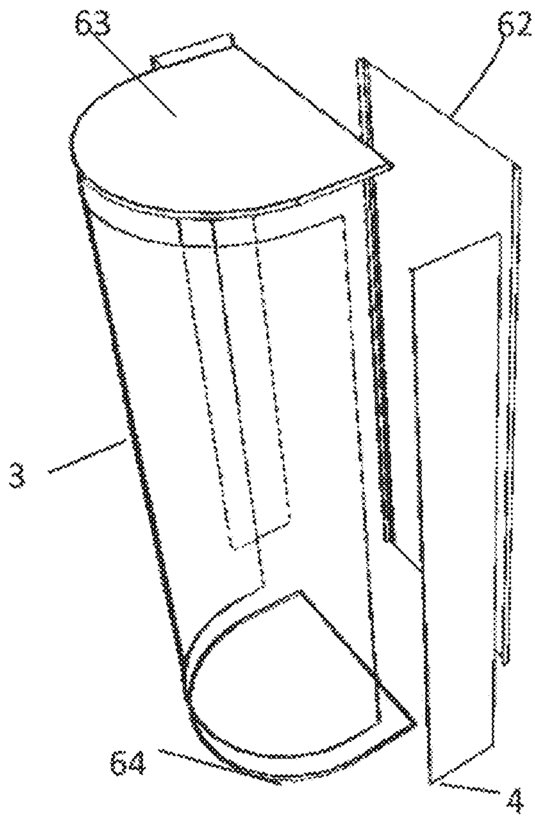
FIG. 10 illustrates a perspective view of hologram cylinder case parts configurations of the mobile display apparatus according to aspect(s) of embodiment(s) of the present invention.
Figure 11A:
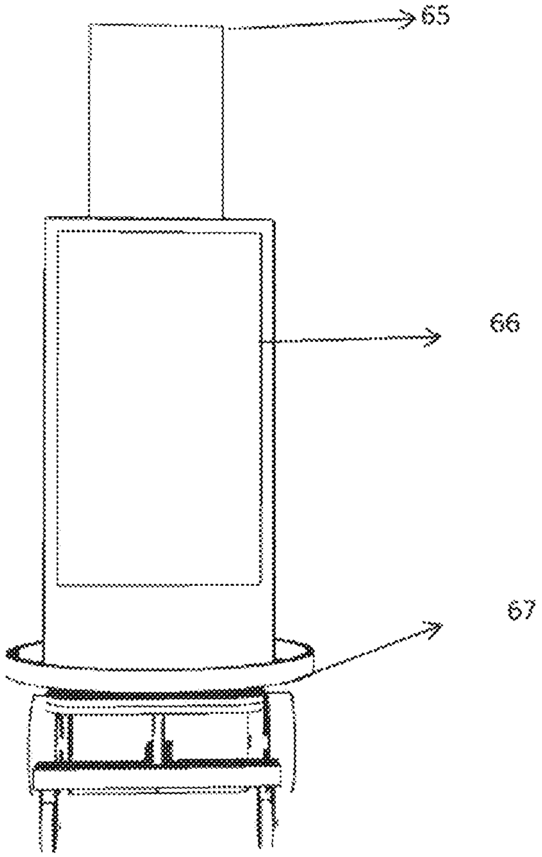
FIG. 11A is a front view of a Mi-Robile Mini with carrier, interactive kiosk and hologram polycarbonate cover.
Figure 11B:
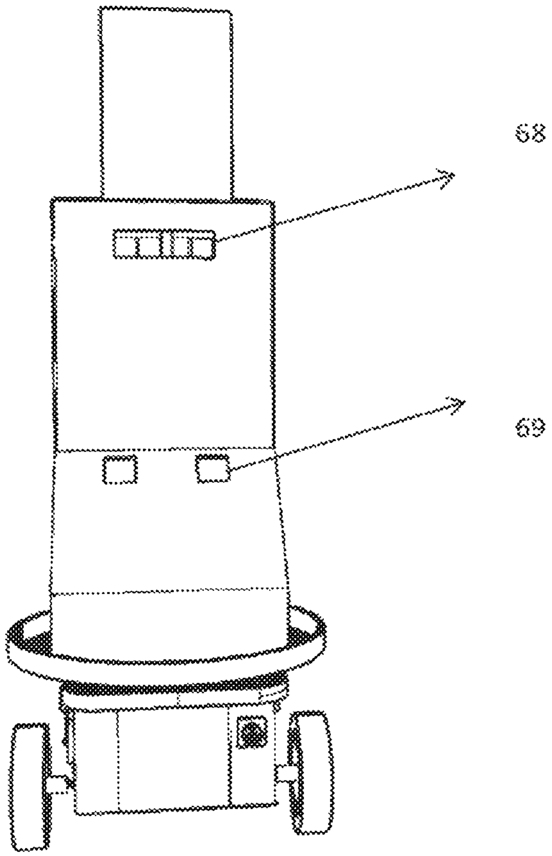
FIG. 11B is a rear view of a Mi-Robile Mini.
Figure 12A:
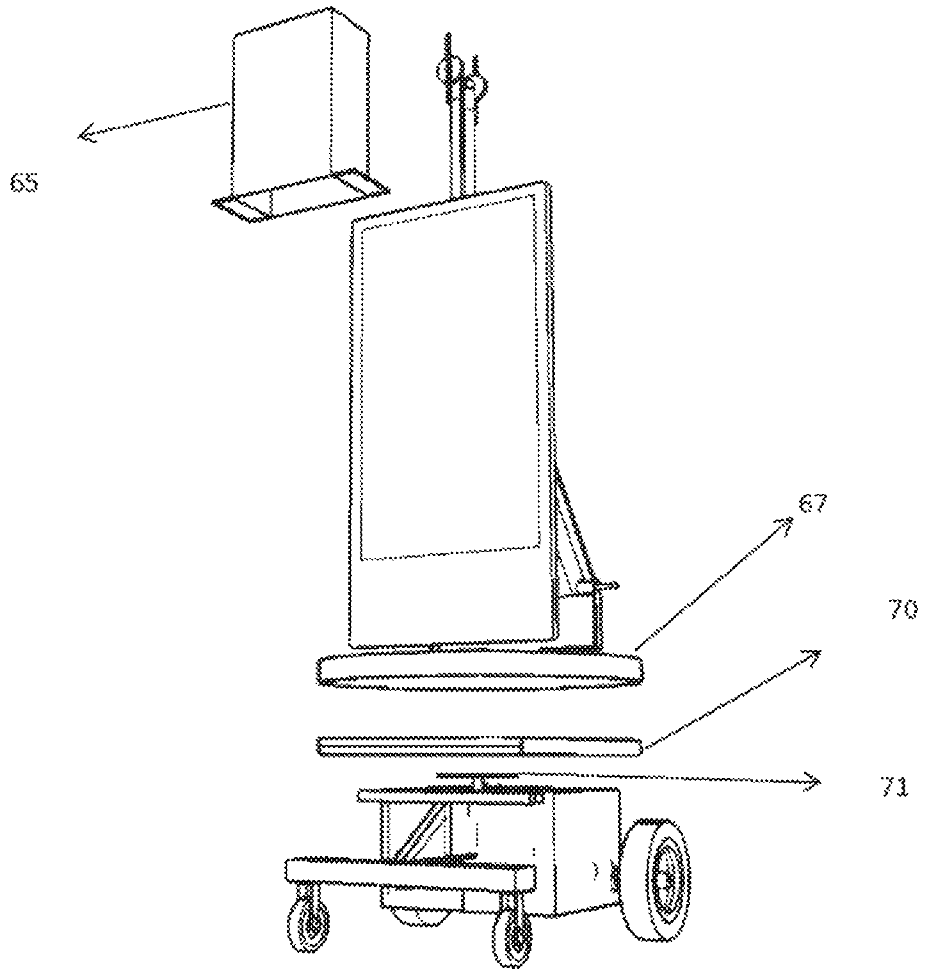
FIG. 12A is a front view of Mi-Robile Mini sections separation.
Figure 12B:
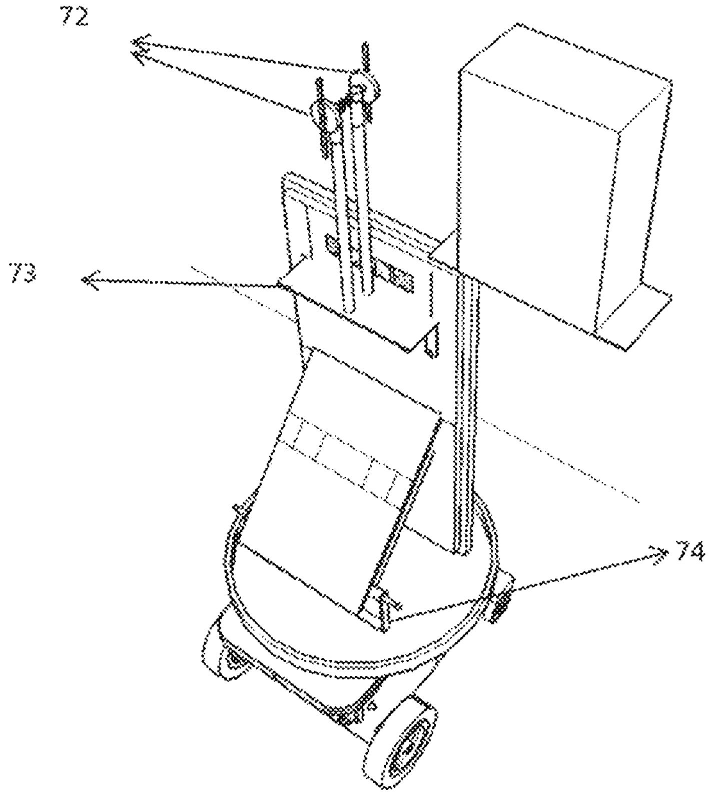
FIG. 12B is a rear perspective view of Mi-Robile Mini sections.
Figure 13A:
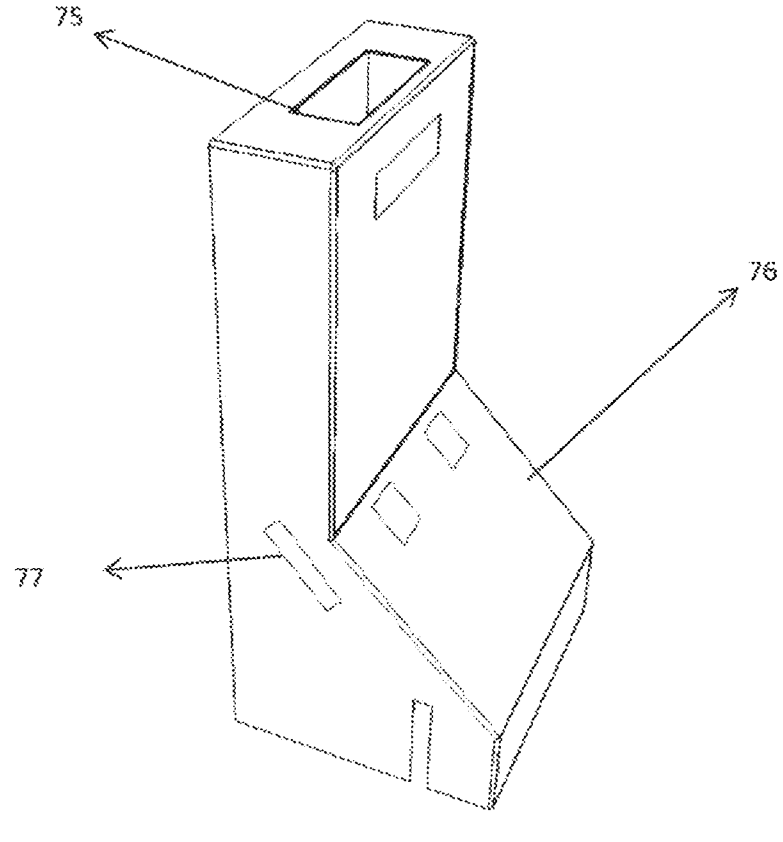
FIG. 13A is a rear angle view of Mi-Robile Mini panel cover.
Figure 13B:
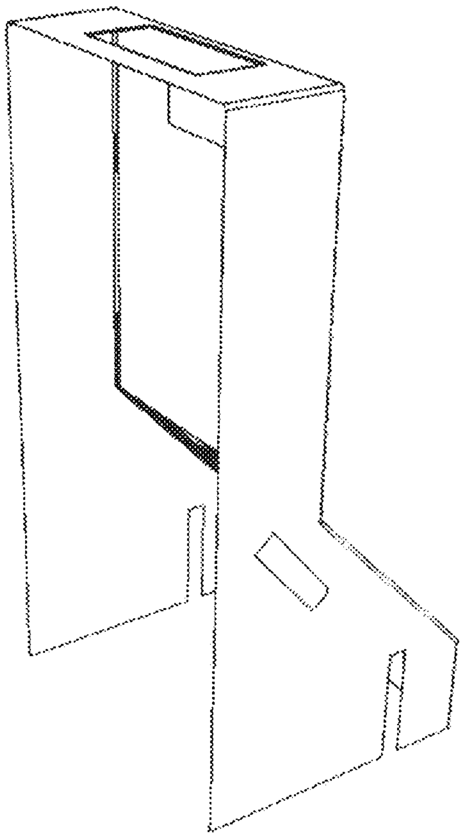
FIG. 13B is a front angle view of Mi-Robile Mini panel cover.

Referring now to FIG. 10, a perspective view of hologram cylinder case parts configurations of the mobile display apparatus is illustrated according to aspect(s) of embodiment (s) of the present invention. FIG. 10 displays a perspective view of FIG. 1 hologram tubular case in separated assemble parts 3 polycarbonate shield, 4 side access panels. Top cover 63, bottom plate 64 and rear panel 62. FIG. 10 shows a perspective view of FIG. 1 hologram tubular case in separated assembly parts-polycarbonate shield 3, side access panels 4. Top cover 63, bottom plate 64 and rear panel 62.

In one or more embodiments, the mobile display apparatus may comprise a Mi-Robile Mini or miniature mobile display apparatus. The miniature mobile display apparatus may be embedded in a larger mobile display apparatus, work in conjunction with another mobile display apparatus, or exist independently of another mobile display apparatus. In one or more aspects, a miniature mobile display apparatus or Mi-Robile Mini has all the features and functionality of the mobile display apparatus except for a smaller size. By virtue of its smaller size, the miniature mobile display apparatus may be able to navigate to places and areas where the regular mobile display apparatus may not.

Referring to FIG. 11-FIG. 19, FIG. 11A shows a front view of the Mi-Robile Mini with carrier 67, interactive kiosk 66 and hologram polycarbonate cover 65. FIG. 11B shows a rear view of the Mi-Robile Mini, with top speakers 68 and bottom speakers 69. FIG. 12A shows a front view of Mi-Robile Mini sections separation, with shield 65 removed, carrier top cover 70, turret plate 71, and turret base plate 67. FIG. 12B shows a rear perspective view of Mi-Robile Mini sections, with two back-to-back holograms 72 for dual display with hologram support bracket, and L-brackets 74 to secure kiosk base to turret plate 67. FIG. 13A shows a rear angle view of Mi-Robile Mini panel cover, with panel slot 75 for back-to-back hologram 72, panel cover 76, and kiosk power switch slot 77. FIG. 13B shows a front angle view of Mi-Robile Mini panel cover. FIG. 14A shows a front view of Mi-Robile Touch with carrier, hologram center top display 78, and polycarbonate window shield.

Figure 14A:
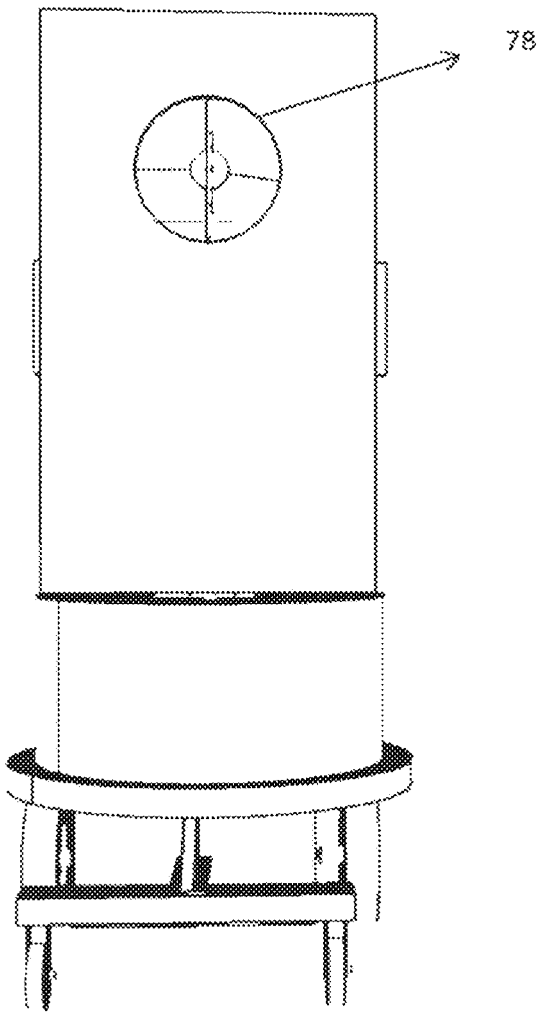
FIG. 14A is a front view of Mi-Robile Touch with carrier, hologram center top display, and polycarbonate window shield.
Figure 14B:
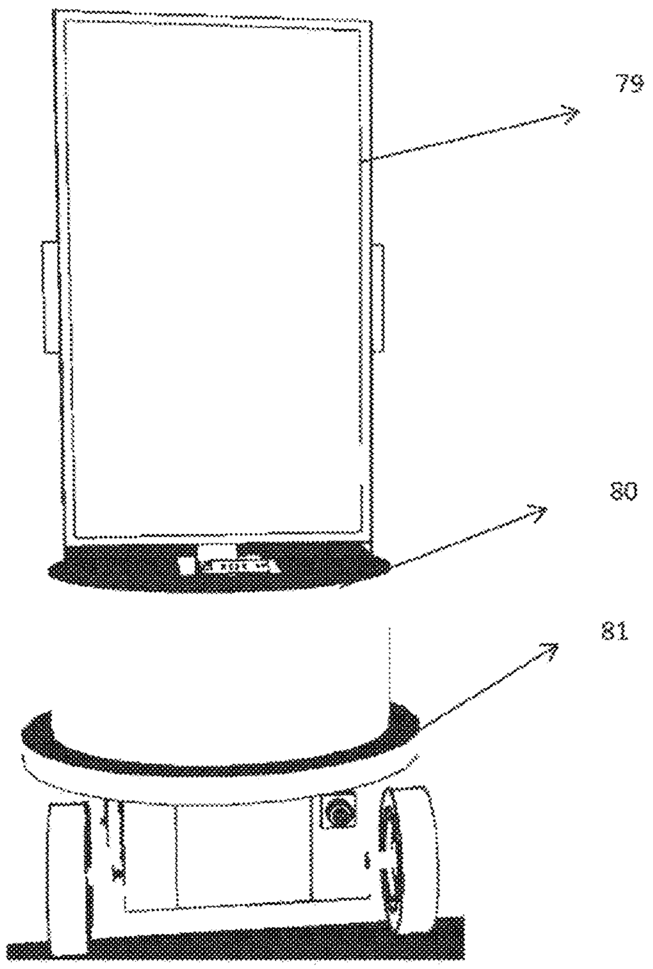
FIG. 14B is a front view of Mi-Robile Touch with carrier and interactive kiosk.
Figure 15A:
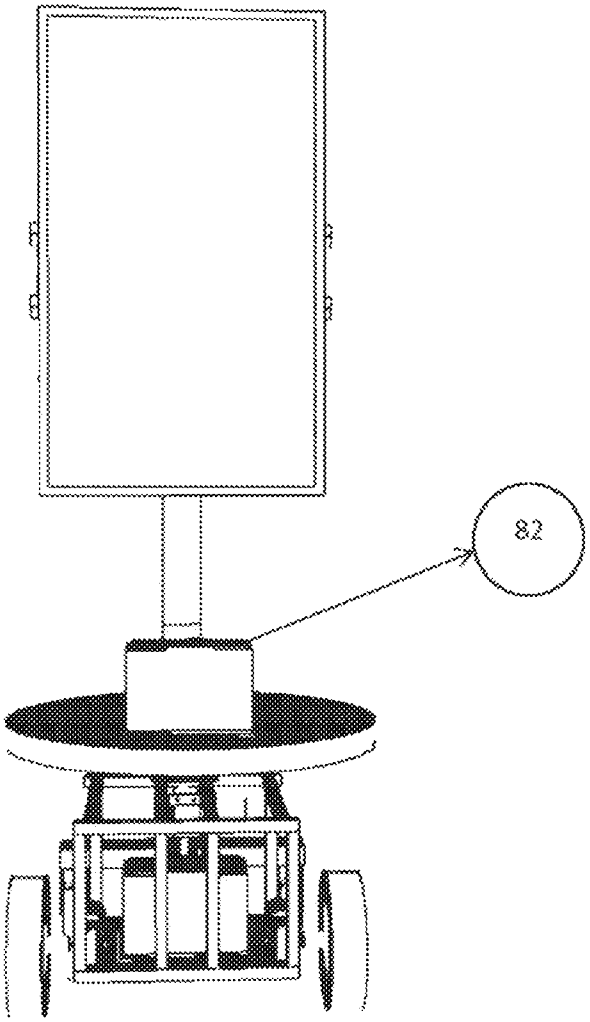
FIG. 15A is a front view of Mi-Robile Touch with carrier and interactive kiosk without panel cover and battery.
Figure 15B:
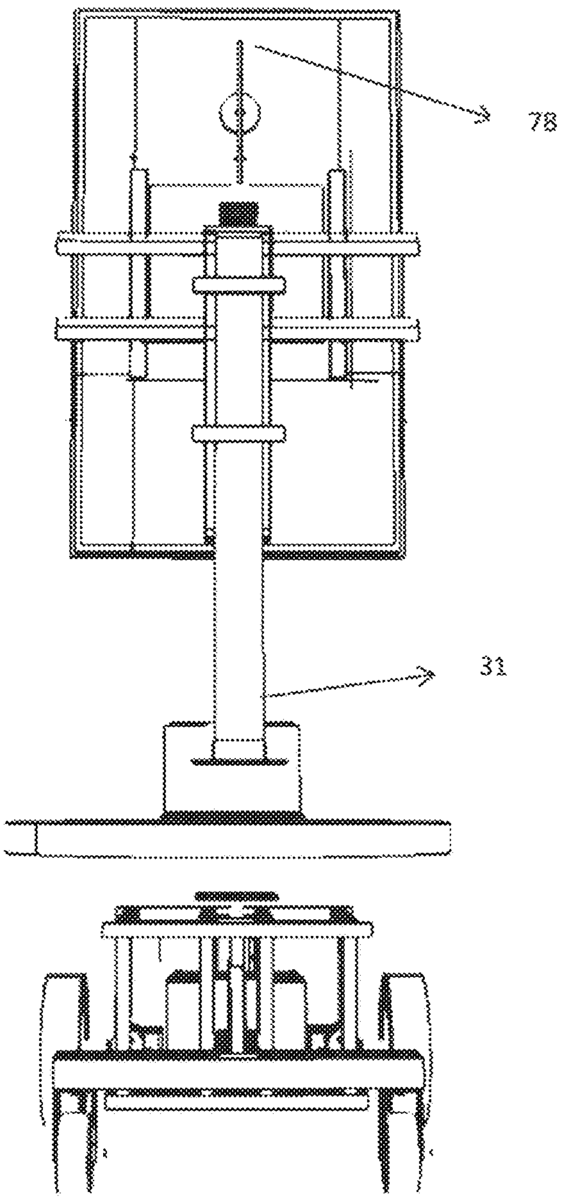
FIG. 15B is a rear view of Mi-Robile Touch with carrier and interactive kiosk without panel cover.
Figure 16:
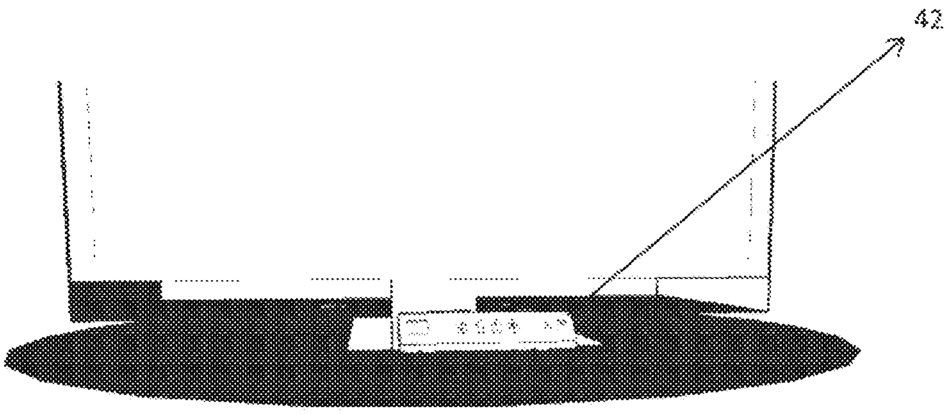
FIG. 16 is a front view of Mi-Robile Touch with kiosk elevation control panel display.
Figure 17A:
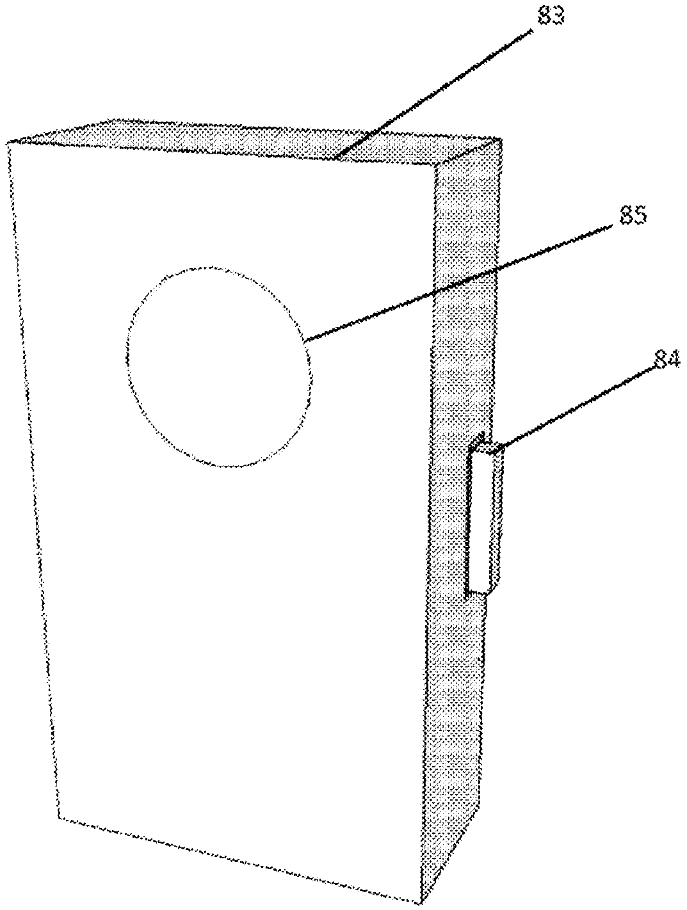
FIG. 17A is a front view of Mi-Robile Touch panel cover center top hologram display window.
Figure 17B:
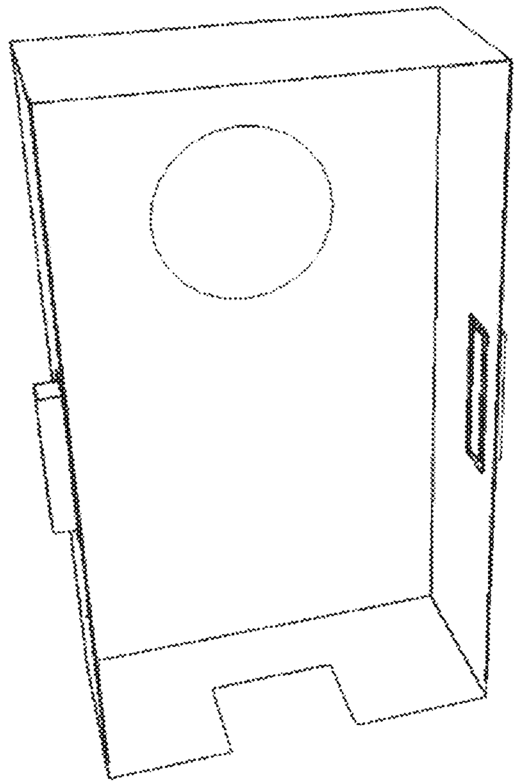
FIG. 17B is a rear view of Mi-Robile Touch panel cover center top hologram display.
Figure 18:
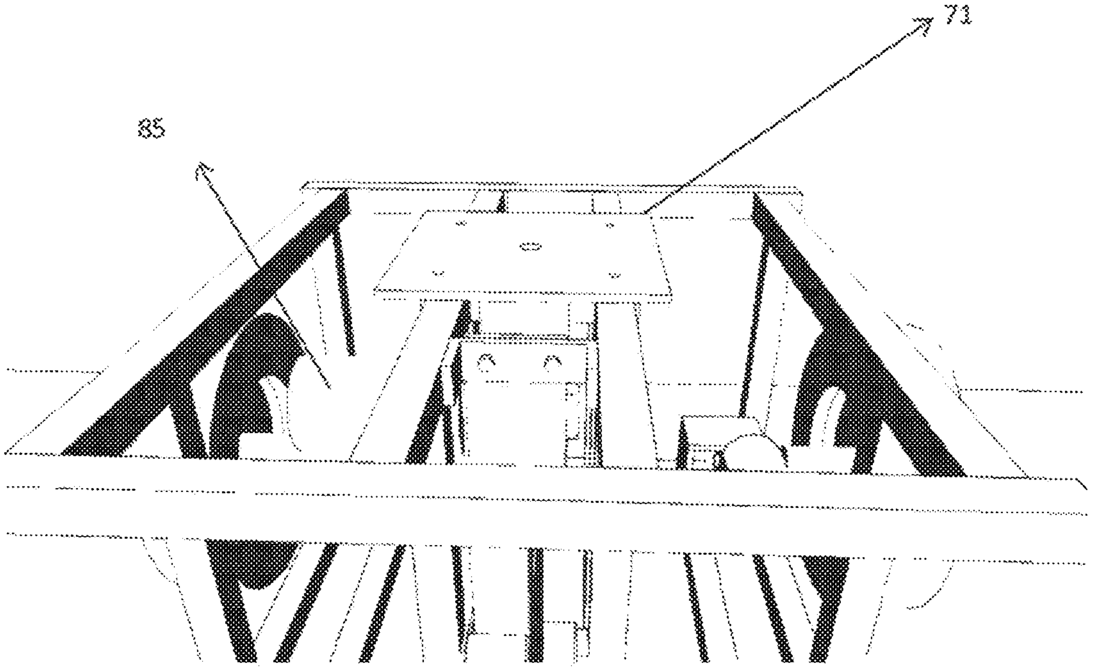
FIG. 18 is a view of Mi-Robile turret plate with right angle gear drive motor in carrier frame for Mini and Touch.
Figure 19:
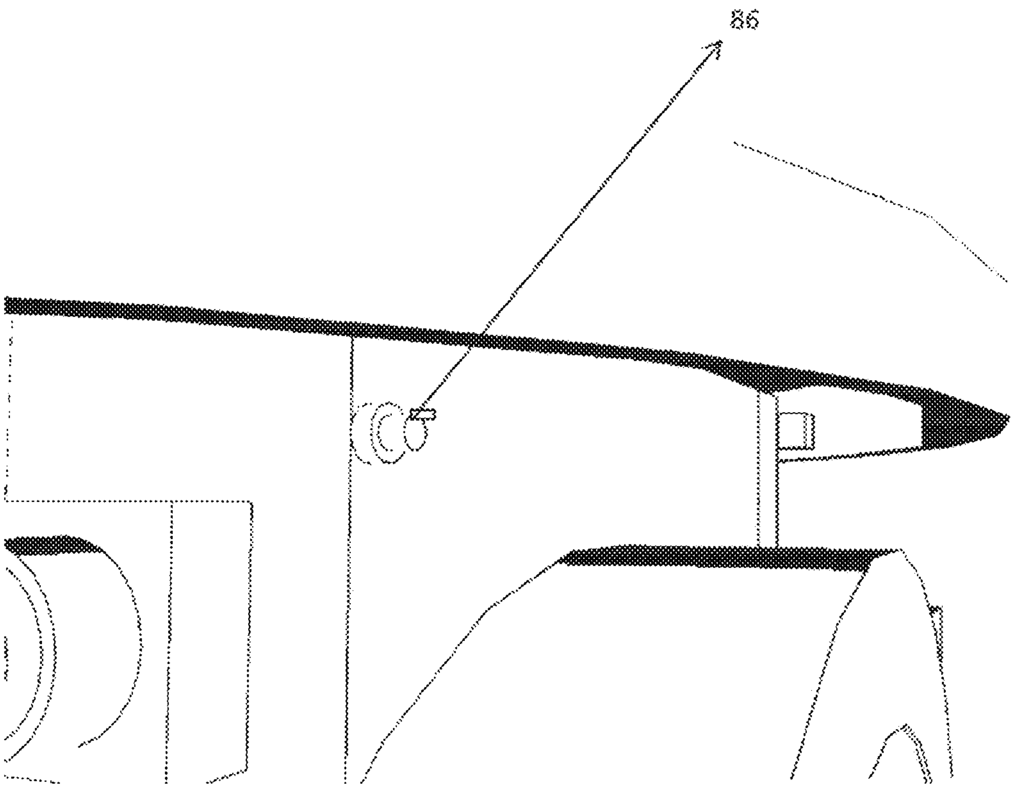
FIG. 19 is a view of Mi-Robile turret speed controller on side panel of carrier frame for Mini and Touch.

FIG. 14B shows a front view of Mi-Robile Touch with carrier, interactive kiosk 79, components dome cover 80, and base plate 81. FIG. 15A shows a front view of Mi-Robile Touch with carrier and interactive kiosk without panel cover and battery 82. FIG. 15B shows a rear view of Mi-Robile Touch with carrier, mounted hologram 78, and kiosk lift system 31. FIG. 16 shows a front view of Mi-Robile Touch with lift system control panel 42. FIG. 17A shows a front view of Mi-Robile Touch panel cover 83, lift system kiosk bracket attachment cover 84, and hologram display window 85. FIG. 17B shows a rear view of Mi-Robile Touch panel cover center top hologram display. FIG. 18 shows the Mi-Robile turret plate 71 with right angle gear drive motor 85 in carrier frame for Mini and Touch. FIG. 19 shows the Mi-Robile turret speed controller 86 on side panel of carrier frame for Mini and Touch.

In one or more aspects, a robotic carrier with multiple displays of visual and voice marketing apparatuses may function by variable power sources such as AC and DC power components. Visual displays may be viewed with multiple kiosks and holograms that travel on the robotic carrier for continual coverage of the marketing area of assignment. The marketing visual displays may be attached to the top of the robot carrier and the many functions may be controlled via wireless remote controllers, cell phones, and other digital devices that transmit and receive analog and digital commands. The kiosk may elevate and descend by manual control panels or wireless remote control by individual lift system apparatuses to a desired position manually or preprogrammed. The center of kiosks may be holograms that can be positioned in multiple heights as the kiosk elevates or descends and rotates 360 degrees for best visual presentation. The hologram tubular case that is attachable when not viewed as a standalone display may have the capability to display multiple holograms up to three or one large hologram usually in the form of a human configuration with speech capability. Power source for the carrier and visual apparatuses may be derived from two batteries via DC to AC converters.

Methods of Use

In one or more embodiments, the present disclosure may be embodied as one or more methods of operation. The one or more methods of operation may be at least:

a. A method comprising: providing a robotic carrier with at least one kiosk having a display and at least one hologram display; controlling movement of the robotic carrier to a location; displaying content on the at least one kiosk and the at least one hologram display; and capturing data on user interactions with the at least one kiosk and the at least one hologram display.

In one or more aspects the method may further comprise telescoping at least one kiosk.

In one or more aspects the method may further comprise rotating at least one hologram display.

In one or more aspects the method may further comprise powering the robotic carrier, the at least one kiosk, and the at least one hologram display using at least one battery and at least one DC to AC converter.

In one or more aspects the method may further comprise, wherein controlling movement of the robotic carrier includes using a wireless remote control.

In one or more aspects the method may further comprise, wherein controlling movement of the robotic carrier includes operating the robotic carrier in an autonomous mode.

In one or more aspects the method may further comprise, wherein controlling movement of the robotic carrier includes operating the robotic carrier in a follow-me mode.

In one or more aspects the method may further comprise displaying content on an illuminated marketing display window.

In one or more aspects the method may further comprise, wherein capturing data includes receiving input through a touchscreen on at least one kiosk.

In one or more aspects the method may further comprise analyzing the captured data to measure return.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

With respect to the above description, it is to be realized that the optimum dimensional relationship for the various components of the invention described above and in the illustrations include variations in size, materials, shape, form, function, and manner of operation, assembly and use, are deemed readily apparent and obvious to one skilled in the art, and all equivalent relationships to those illustrates in the drawings and described in the specification are intended to be encompassed by the invention.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). Data can be stored in the cloud as well.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A mobile display apparatus comprising:

a holographic platform, wherein said holographic platform comprises of:

a carrier main frame, having a base and a top portion;

at least two rear drive wheels and at least one caster wheels, wherein said rear drive and said caster wheels are connected to the base of said carrier main frame;

at least one holographic apparatus, connected to said top portion of said carrier main frame;

a turret rotation assembly connected to the base of said carrier main frame;

a display carrier, having base and top portions and detachably connected to said holographic platform by way of a detachable wheeled support assembly, wherein said display carrier comprises of:

a display carrier main frame, having top and base portions;

a dual display kiosk cabinet, positioned above said top portion of said main frame, said kiosk cabinet bearing two displays;

at least two rear drive wheels and at least one caster wheels, wherein said rear drive and said caster wheels are connected to the base of said display carrier main frame;

at least one power source positioned within said base of said display carrier main frame;

a motor driver within said base of said display carrier main frame;

a control access panel positioned atop said top of display carrier main frame; wherein said control access panel comprises of at least one central processing unit (CPU), memory, and electronic components for operation of said mobile display apparatus; and an accordion panel cover, covering said dual display kiosk cabinet.

2. The apparatus of claim 1, wherein said holographic platform further comprises a tubular shield.

3. The apparatus of claim 1, wherein said holographic platform further comprises of a hologram tower fastened to a base of a hologram tube casing, wherein said hologram tube casing is connected to said top portion of said carrier main frame.

4. The apparatus of claim 1, wherein said holographic platform further comprises of at least one hologram generator, at least one light bar, and at least light bar strip, wherein all are positioned within said hologram tower.

5. The apparatus of claim 1, wherein said two displays are structured to be telescoping by way of kiosk telescoping lift system positioned within said dual display kiosk cabinet.

6. The apparatus of claim 1, wherein said CPU further comprises of computer readable medium for operations of said mobile display apparatus.

7. The apparatus of claim 1, wherein said display carrier further comprises of at least one AC-DC/DC-AC converter connected to at least one component of said mobile display apparatus.

8. The apparatus of claim 1, wherein said display carrier further comprises of at least one interchangeable display window.

* * * * *